US012292704B2

(12) United States Patent
Sato

(10) Patent No.: US 12,292,704 B2
(45) Date of Patent: May 6, 2025

(54) IMAGE FORMING APPARATUS AND PROCESS CARTRIDGE INCLUDING DEVELOPMENT HOUSING AT WHICH SLOPE FOR TONER IS PROVIDED

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/480,069

(22) Filed: Oct. 3, 2023

(65) Prior Publication Data

US 2024/0152076 A1 May 9, 2024

(30) Foreign Application Priority Data

Nov. 9, 2022 (JP) ................................ 2022-179923

(51) Int. Cl.
*G03G 15/08* (2006.01)
*G03G 21/18* (2006.01)

(52) U.S. Cl.
CPC ..... *G03G 15/0865* (2013.01); *G03G 15/0877* (2013.01); *G03G 15/0874* (2013.01); *G03G 21/1814* (2013.01); *G03G 2215/0673* (2013.01); *G03G 2215/0678* (2013.01); *G03G 2215/0682* (2013.01)

(58) Field of Classification Search
CPC ........... G03G 15/0865; G03G 15/0877; G03G 2215/0673; G03G 2215/0678
USPC .................................... 399/258; 222/DIG. 1
See application file for complete search history.

(56) References Cited

U.S. PATENT DOCUMENTS

| | | | | |
|---|---|---|---|---|
| 6,006,046 A * | 12/1999 | MacFarland ....... | G03G 15/0867 399/13 |
| 2010/0008701 A1* | 1/2010 | Izumi ................ | G03G 15/0893 399/257 |
| 2011/0052266 A1* | 3/2011 | Yoon ................. | G03G 15/0886 399/258 |

(Continued)

FOREIGN PATENT DOCUMENTS

| | | | |
|---|---|---|---|
| JP | 2017026923 A * | 2/2017 | ......... G03G 15/0882 |
| JP | 2019-132924 A | 8/2019 | |
| JP | 2021-26202 A | 2/2021 | |

*Primary Examiner* — Robert B Beatty
(74) *Attorney, Agent, or Firm* — Merchant & Gould P.C.

(57) ABSTRACT

A development unit includes a development housing configured to store toner and a development roller rotatable about a development axis extending in a first direction. The development roller supplies the toner in the development housing to a photosensitive drum. The development housing includes a reception port and a slope. The reception port receives toner from a toner container configured to store the toner to be supplied to the development housing. The reception port is located away from the development roller in a second direction crossing the first direction. The slope is located below the reception port in the development housing. The slope includes a first slope portion and a second slope portion. The first slope portion is inclined downward away from the reception port in the first direction. The second slope portion is inclined downward toward the development roller in the second direction.

19 Claims, 23 Drawing Sheets

(56) References Cited

U.S. PATENT DOCUMENTS

| | | | | |
|---|---|---|---|---|
| 2015/0055985 | A1* | 2/2015 | Suzuki ............... | G03G 15/0879<br>399/258 |
| 2017/0261887 | A1* | 9/2017 | Ishizuka ............ | G03G 15/0879 |
| 2021/0232061 | A1 | 7/2021 | Cho et al. | |
| 2022/0155708 | A1 | 5/2022 | Sato et al. | |

* cited by examiner

IMAGE FORMING APPARATUS AND PROCESS CARTRIDGE INCLUDING DEVELOPMENT HOUSING AT WHICH SLOPE FOR TONER IS PROVIDED

REFERENCE TO RELATED APPLICATIONS

This application claims priority from Japanese Patent Application No. 2022-179923 filed on Nov. 9, 2022. The entire content of the priority application is incorporated herein by reference.

BACKGROUND ART

An image forming apparatus including a photosensitive drum and a development device is known.

DESCRIPTION

In an image forming apparatus, a development container can be supplied with toner. Specifically, the development container has a supply port. The supply port receives toner from a toner pouch containing toner to be supplied to the development container.

In the image forming apparatus described above, after toner is supplied to the development container, an agitator extending in the longitudinal direction of the development container is driven to spread the supplied toner over the entire development container.

Thus, there is a problem that it takes time for the supplied toner to spread over the entire development container and a supplying operation of toner takes time.

In view of the foregoing, an example of an object of this disclosure is to provide an image forming apparatus and a process cartridge configured to smoothly supply a development unit with toner.

According to one aspect, this specification discloses an image forming apparatus. The image forming apparatus includes a photosensitive drum and a development unit. The photosensitive drum is rotatable about a drum axis extending in a first direction. The development unit includes a development housing and a development roller. The development housing is configured to store toner. The development roller is rotatable about a development axis extending in the first direction. The development roller is configured to supply the toner in the development housing to the photosensitive drum. The development housing includes a reception port and a slope. The reception port is configured to receive toner from a toner container configured to store the toner to be supplied to the development housing. The reception port is located away from the development roller in a second direction crossing the first direction. The slope is located below the reception port in the development housing. The slope includes a first slope portion and a second slope portion. The first slope portion is inclined downward away from the reception port in the first direction. Thus, the toner supplied into the development housing through the reception port flows in directions away from the reception port in the first direction. The second slope portion is inclined downward toward the development roller in the second direction. Thus, the toner supplied into the development housing through the reception port flows in a direction toward the development roller in the second direction. Thus, by supplying toner from the reception port into the development housing, the toner flows toward the development roller while being distributed throughout the entirety of the development housing in the first direction. As a result, it is unnecessary to spread the toner to the entirety of the development housing after the toner is supplied, and the development unit is smoothly supplied with toner. According to another aspect, this specification also discloses a process cartridge including the photosensitive drum and the development unit described above.

1. OUTLINE OF IMAGE FORMING APPARATUS 1

An outline of an image forming apparatus 1 will be described with reference to FIGS. 1 and 2.

Figure 1:
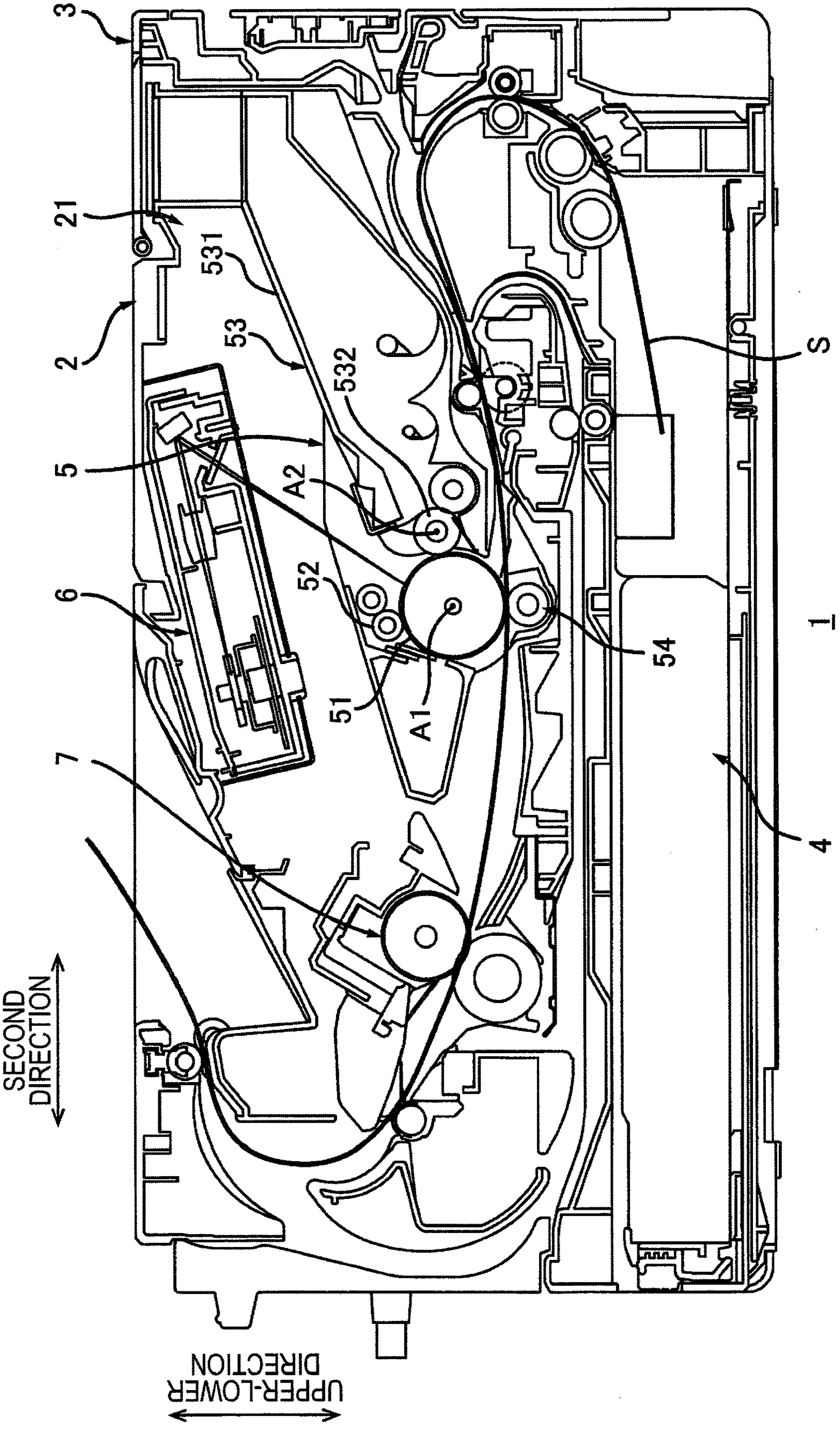
FIG. 1 is a schematic configuration diagram of an image forming apparatus.

As shown in FIG. 1, the image forming apparatus 1 includes a main housing 2, a first cover 3, a sheet storage section 4, a process cartridge 5, an exposure device 6, and a fuser (fixing device) 7.

1.1 Main Housing 2

The main housing 2 accommodates the sheet storage section 4, the process cartridge 5, the exposure device 6, and the fuser 7. The main housing 2 has an opening 21 (see FIG. 2).

1.2 First Cover 3

Figure 2:
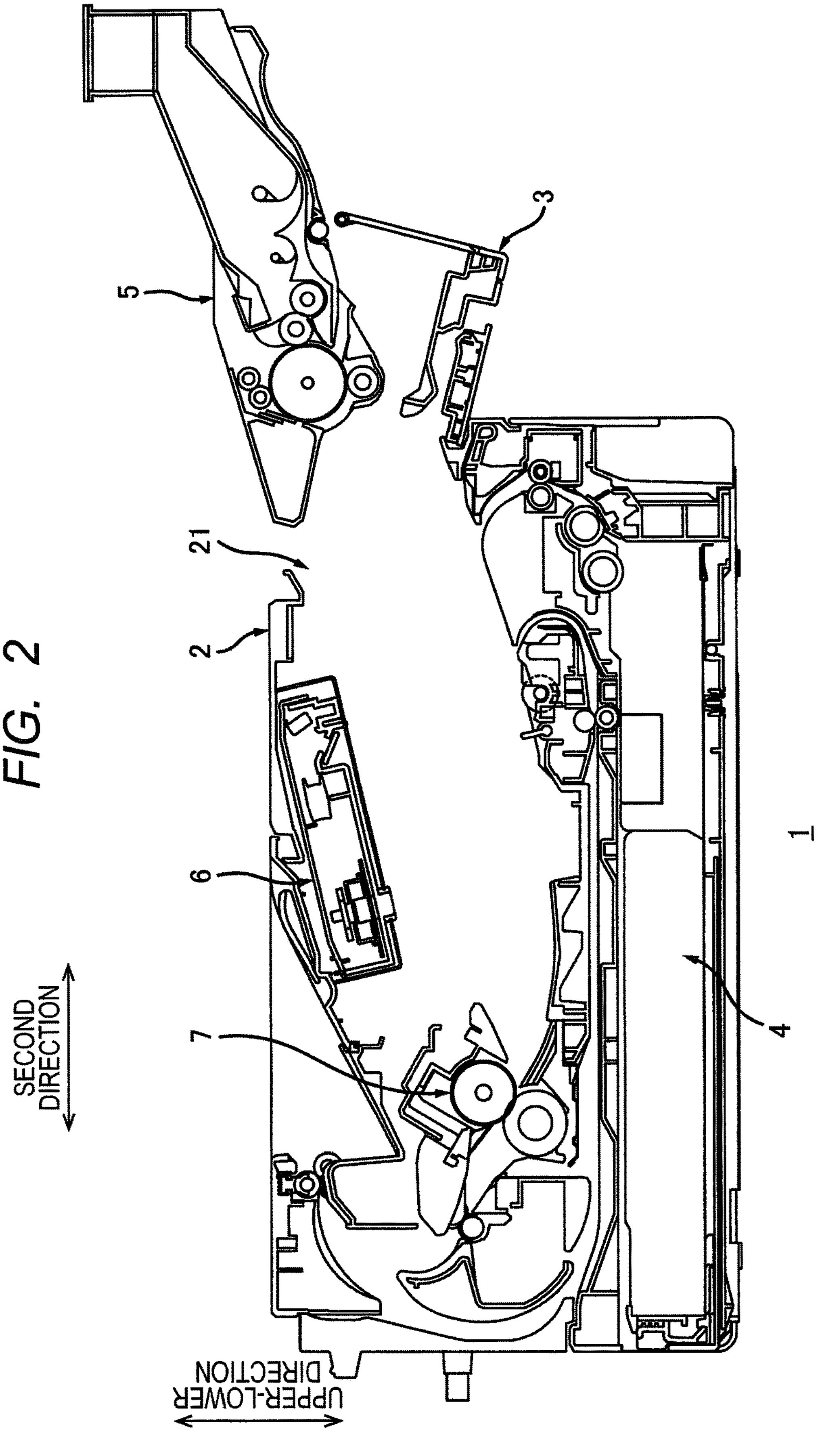
FIG. 2 shows a state where a process cartridge shown in FIG. 1 is detached from the image forming apparatus.

The first cover 3 is movable between a first cover closed position (see FIG. 1) and a first cover open position (see FIG. 2). As shown in FIG. 1, the first cover 3 closes the opening 21 in a state where the first cover 3 is located at the first cover closed position. As shown in FIG. 2, the opening 21 is opened in a state where the first cover 3 is located at the first cover open position.

1.3 Sheet Storage Section 4

As shown in FIG. 1, the sheet storage section 4 is configured to store sheets S therein. The sheet S in the sheet storage section 4 is conveyed toward a transfer roller 54. The transfer roller 54 will be explained later.

1.4 Process Cartridge 5

The process cartridge 5 is attached to the image forming apparatus 1. In a state where the process cartridge 5 is attached to the image forming apparatus 1, the process cartridge 5 is located inside the main housing 2. As shown in FIG. 2, in a state where the first cover 3 is located at the first cover open position, the process cartridge 5 is attachable to and detachable from the image forming apparatus through the opening 21. The process cartridge 5 is detached from the image forming apparatus 1, for example, when the process cartridge 5 needs to be replaced.

As shown in FIG. 1, the process cartridge 5 includes a photosensitive drum 51, a charging roller 52, a development unit 53, and the transfer roller 54 as an example of a transfer device. That is, the image forming apparatus 1 includes the photosensitive drum 51, the development unit 53, and the transfer device.

1.4.1 Photosensitive Drum 51

The photosensitive drum 51 is rotatable about a drum axis A1. The drum axis A1 extends in a first direction. The photosensitive drum 51 extends in the first direction. The photosensitive drum 51 has a cylindrical shape. The first direction is a horizontal direction in a state where the image forming apparatus 1 is placed on a horizontal surface and the process cartridge 5 is attached to the image forming apparatus 1.

In a state where the process cartridge 5 is attached to the image forming apparatus 1, the photosensitive drum 51 is located between the fuser 7 and the first cover 3 in a second direction. The second direction crosses the first direction and an upper-lower direction (vertical direction). For example, the second direction is perpendicular to the first direction and the upper-lower direction.

In a state where the process cartridge 5 is attached to the image forming apparatus 1, the photosensitive drum 51 is located between the sheet storage section 4 and the exposure device 6 in the upper-lower direction. In a state where the process cartridge 5 is attached to the image forming apparatus 1, the photosensitive drum 51 is located below the exposure device 6.

1.4.2 Charging Roller 52

The charging roller 52 charges the photosensitive drum 51. The image forming apparatus 1 may include a scorotron charger instead of the charging roller 52.

1.4.3 Development Unit 53

The development unit 53 supplies toner to the photosensitive drum 51. In a state where the process cartridge 5 is attached to the image forming apparatus 1, the development unit 53 is located between the photosensitive drum 51 and the first cover 3 in the second direction. In a state where the process cartridge 5 is attached to the image forming apparatus 1, the development unit 53 is located between the exposure device 6 and the sheet storage section 4 in the upper-lower direction. The development unit 53 includes a development housing 531 and a development roller 532.

The development housing 531 contains toner. The development housing 531 supports the development roller 532.

The development roller 532 is located at one end of the development housing 531 in the second direction. The development roller 532 supplies the toner in the development housing 531 to the photosensitive drum 51. The development roller 532 contacts the photosensitive drum 51. The development roller 532 may be separable from the photosensitive drum 51. The development roller 532 is rotatable about a development axis A2. The development axis A2 extends in the first direction.

1.4.4 Transfer Roller 54

The transfer roller 54 transfers the toner on the photosensitive drum 51 onto the sheet S. Specifically, the sheet S from the sheet storage section 4 passes between the transfer roller 54 and the photosensitive drum 51. At this time, the transfer roller 54 transfers the toner on the photosensitive drum 51 to the sheet S. In a state where the process cartridge 5 is attached to the image forming apparatus 1, the transfer roller 54 is located below the photosensitive drum 51. The transfer roller 54 contacts the photosensitive drum 51.

1.5 Exposure Device 6

The exposure device 6 exposes the photosensitive drum 51. Specifically, in a state where the process cartridge 5 is attached to the main housing 2, the exposure device 6 exposes the surface of the photosensitive drum 51 charged by the charging roller 52. The development unit 53 supplies toner to the exposed surface of the photosensitive drum 51. In this embodiment, the exposure device 6 is a laser scanning unit. The exposure device 6 may be an LED head.

1.6 Fuser 7

The fuser 7 is located away from the first cover 3 in the second direction. The fuser 7 fixes the toner transferred to the sheet S onto the sheet S. In this embodiment, the fuser 7 fixes the toner onto the sheet S by heating and pressurizing the sheet S on which the toner has been transferred. The sheet S having passed through the fuser 7 is discharged onto the upper surface of the main housing 2.

2. DETAILS OF PROCESS CARTRIDGE 5

Figure 3:
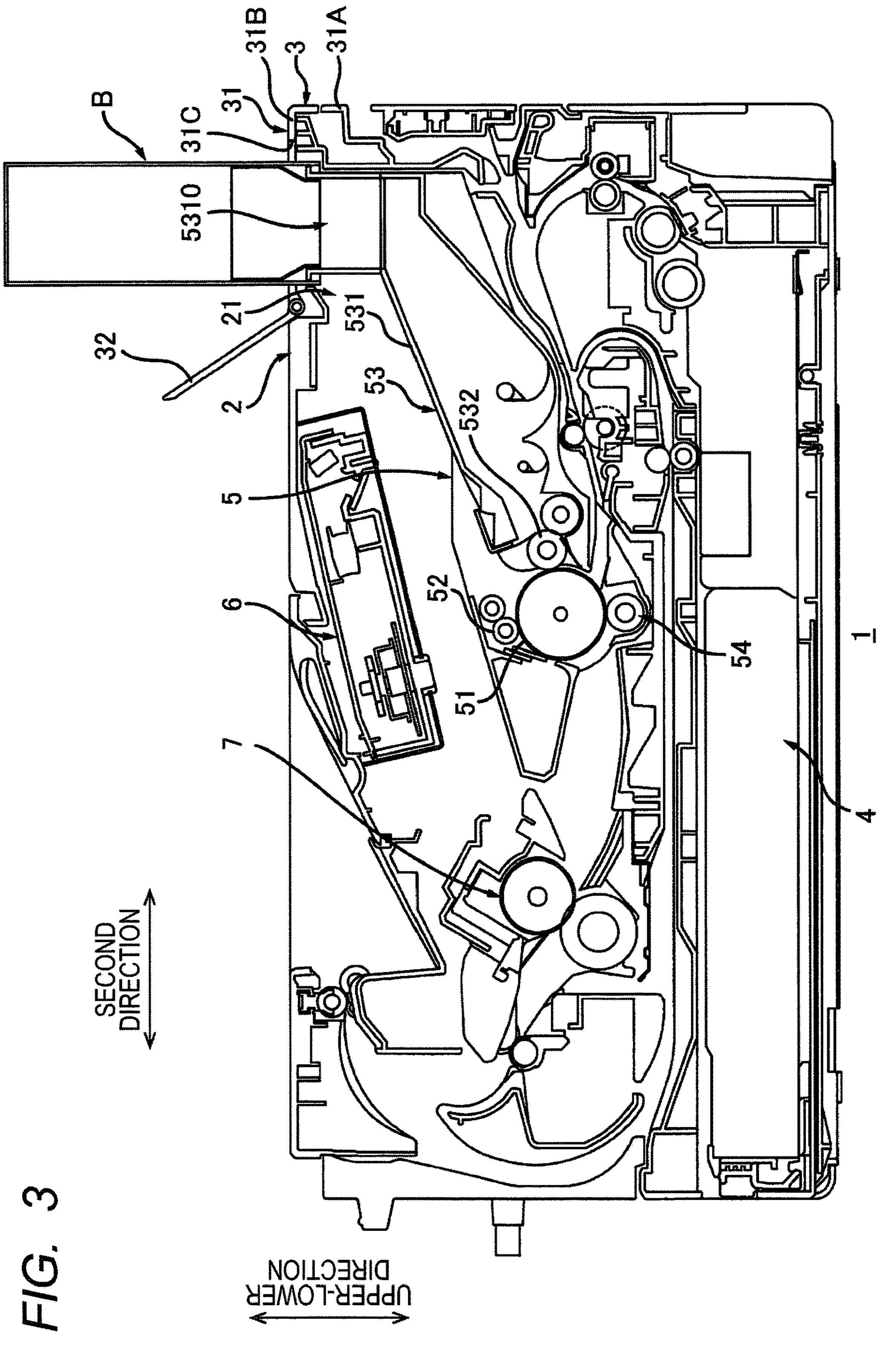
FIG. 3 is an explanatory diagram for explaining a toner supplying operation.

As shown in FIG. 3, in the image forming apparatus 1 of the present disclosure, in a state where the process cartridge 5 is attached to the image forming apparatus 1, a user supplies toner to the development unit 53 of the process cartridge 5.

Figure 4:
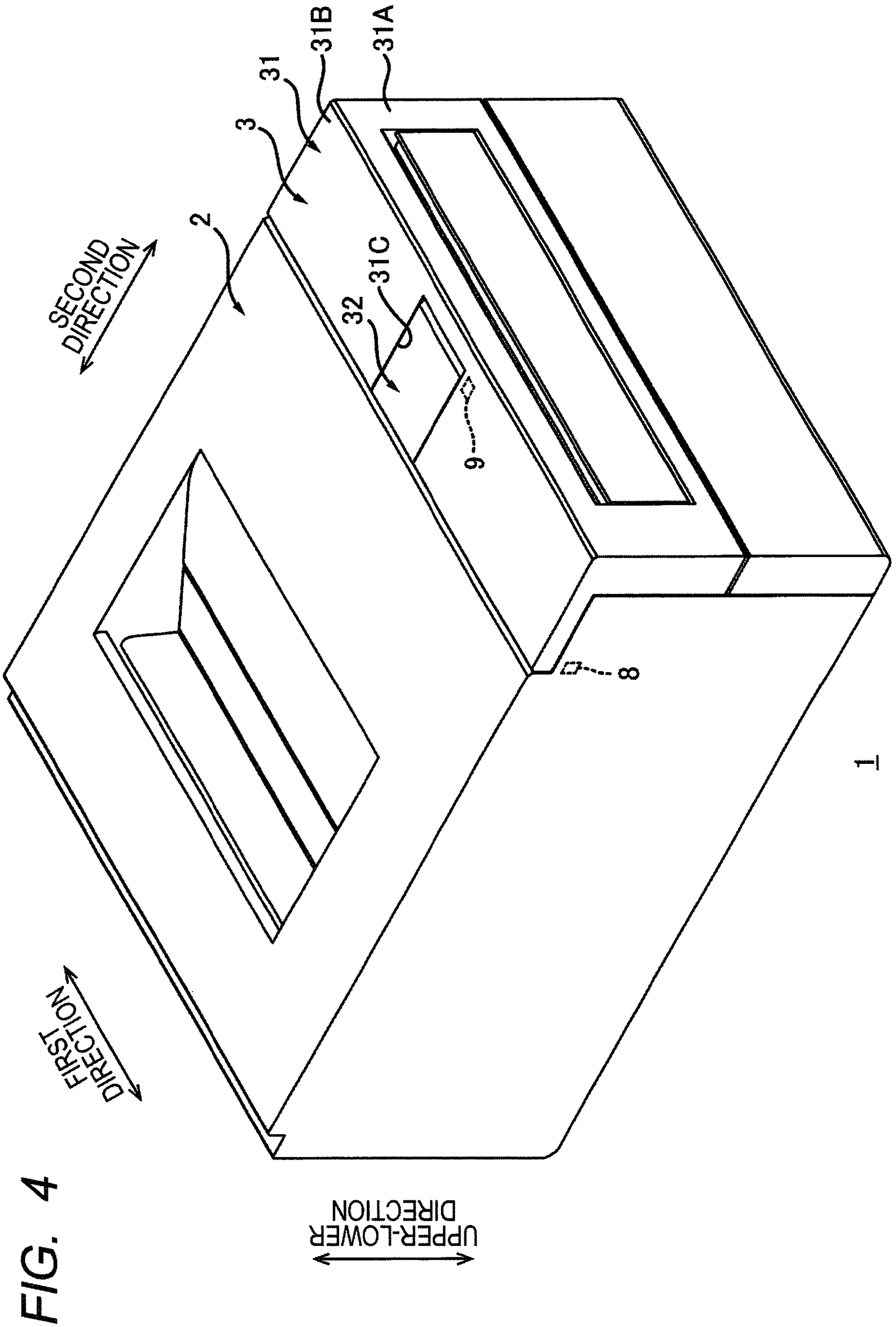
FIG. 4 is a perspective view of the image forming apparatus shown in FIG. 1.

Specifically, as shown in FIG. 4, the first cover 3 includes a cover main body 31 and a second cover 32. The image forming apparatus 1 further includes a first sensor 8 and a second sensor 9.

The cover main body 31 extends in the first direction. The cover main body 31 has a first portion 31A, a second portion 31B, and an opening 31C. In a state where the first cover 3 is located at the first cover closed position, the first portion 31A extends in the upper-lower direction. In a state where the first cover 3 is located at the first cover closed position, the second portion 31B is located at the upper end of the first portion 31A. In a state where the first cover 3 is located at the first cover closed position, the second portion 31B extends in the second direction. The opening 31C is located at a center portion of the second portion 31B in the first direction.

Figure 5:
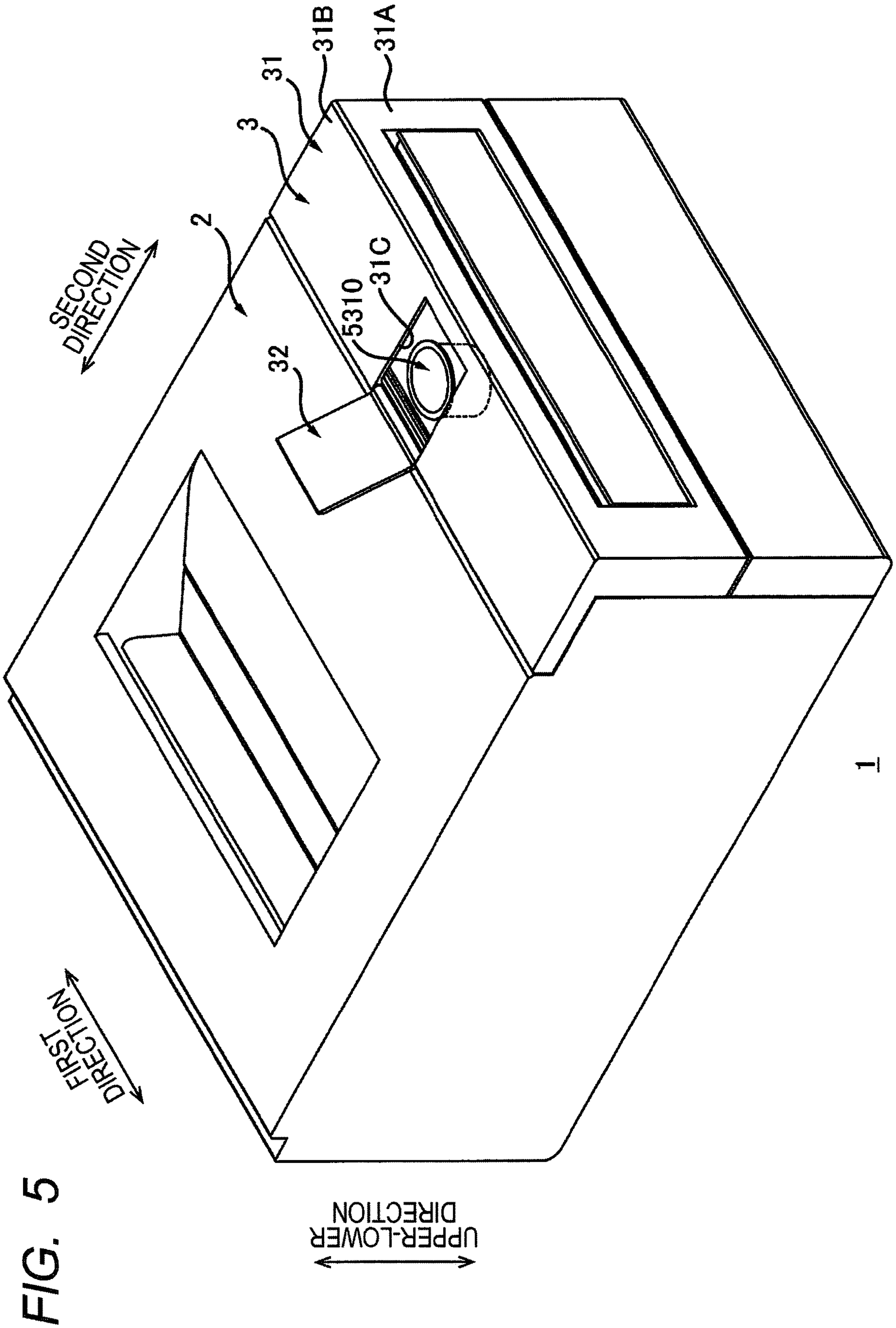
FIG. 5 shows a state where a second cover shown in FIG. 4 is located at a second cover open position.

The second cover 32 is movable between a second cover closed position (see FIG. 4) and a second cover open position (see FIG. 5). As shown in FIG. 4, in a state where the second cover 32 is located at the second cover closed position, the second cover 32 closes the opening 31C. As shown in FIG. 5, in a state where the second cover 32 is located at the second cover open position, the opening 31C is opened.

The first sensor 8 detects whether the first cover 3 is located at the first cover closed position.

The second sensor 9 detects whether the second cover 32 is located at the second cover closed position.

When the image forming apparatus 1 receives a print job, the first sensor 8 detects that the first cover 3 is located at the first cover closed position, and the second sensor 9 detects that the second cover 32 is located at the second cover closed position, the image forming apparatus 1 starts printing.

When the image forming apparatus 1 receives a print job, if the first sensor 8 does not detect that the first cover 3 is located at the first cover closed position or the second sensor 9 does not detect that the second cover 32 is located at the second cover closed position, the image forming apparatus 1 stands by without printing.

As shown in FIG. 3, in order to supply toner to the development unit 53, in a state where the process cartridge 5 is attached to the image forming apparatus 1, the user moves the second cover 32 to the second cover open position, and connects a toner container B to the reception port 5310 of the development housing 531 of the process cartridge 5. The toner container B contains toner to be supplied to the development housing 531. Then, the user supplies the toner in the toner container B into the development housing 531. At this time, the second cover 32 is located at the second cover open position. Thus, the second sensor 9 does not detect that the second cover 32 is located at the second cover closed position. Thus, the image forming apparatus 1 stands by without printing.

After that, when the user completes supplying of toner and moves the second cover 32 to the second cover closed position, the image forming apparatus 1 stands by until a particular time (for example, two seconds) elapses and then starts printing. By the time the particular time elapses after the second cover 32 is located at the second cover closed position, the toner supplied inside the development housing 531 spreads over the entirety of the development housing 531 in the first direction.

Hereinafter, details of the process cartridge 5 will be described with reference to FIGS. 6 to 10.

Figure 6:
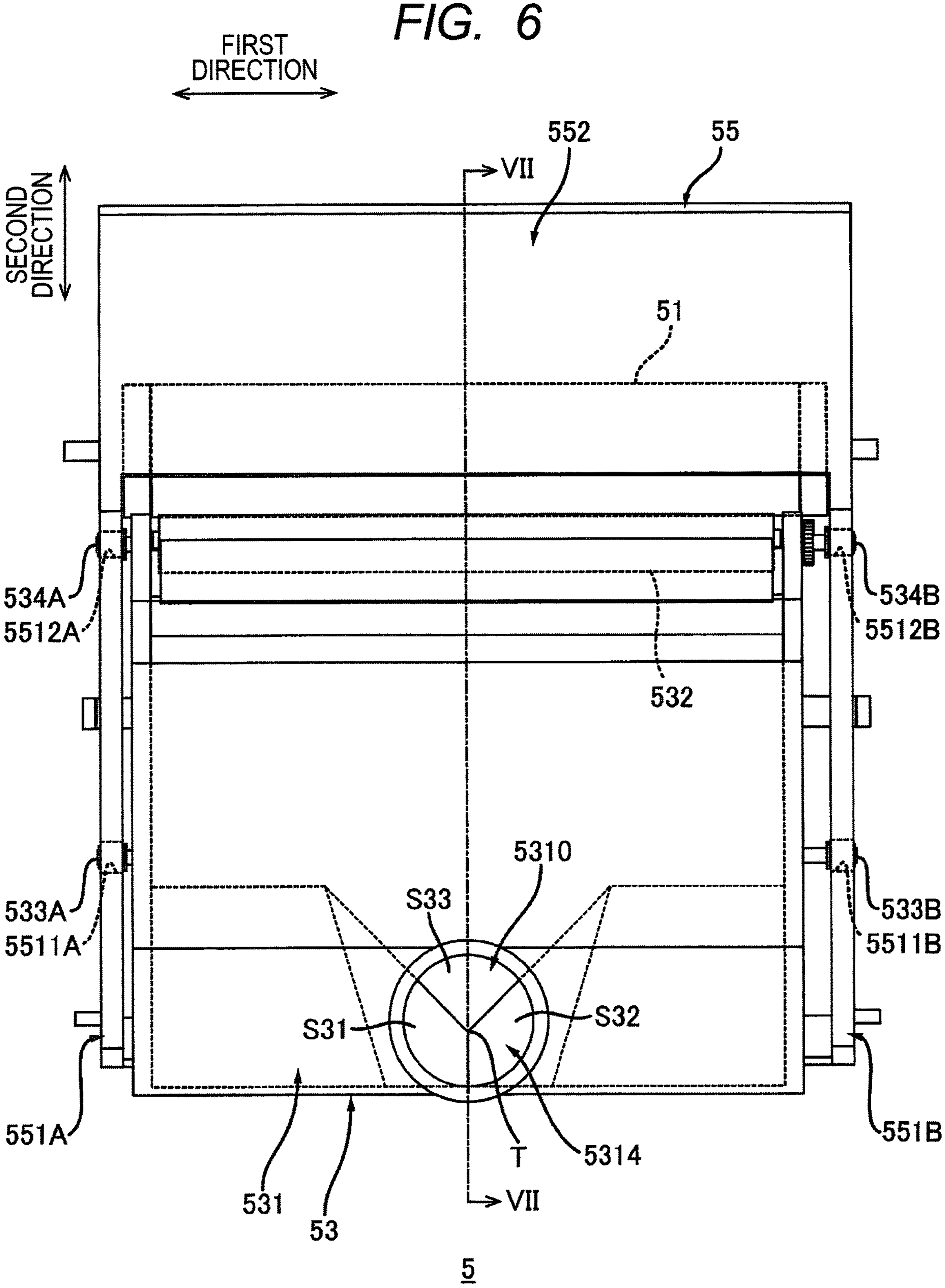
FIG. 6 is a plan view of the process cartridge shown in FIG. 1.

As shown in FIG. 6, the process cartridge 5 includes a frame 55 in addition to the photosensitive drum 51, the charging roller 52 (see FIG. 7), the development unit 53, and the transfer roller 54 (see FIG. 7) described above.

2.1 Frame 55

The frame 55 supports the photosensitive drum 51, the charging roller 52, the development unit 53, and the transfer roller 54. The frame 55 includes two side plates 551A and 551B, a waste toner container 552, and a drum cleaning member 553 (see FIG. 7). In other words, the process cartridge 5 includes the waste toner container 552 and the drum cleaning member 553.

2.1.1 Side Plates 551A and 551B

Figure 8:
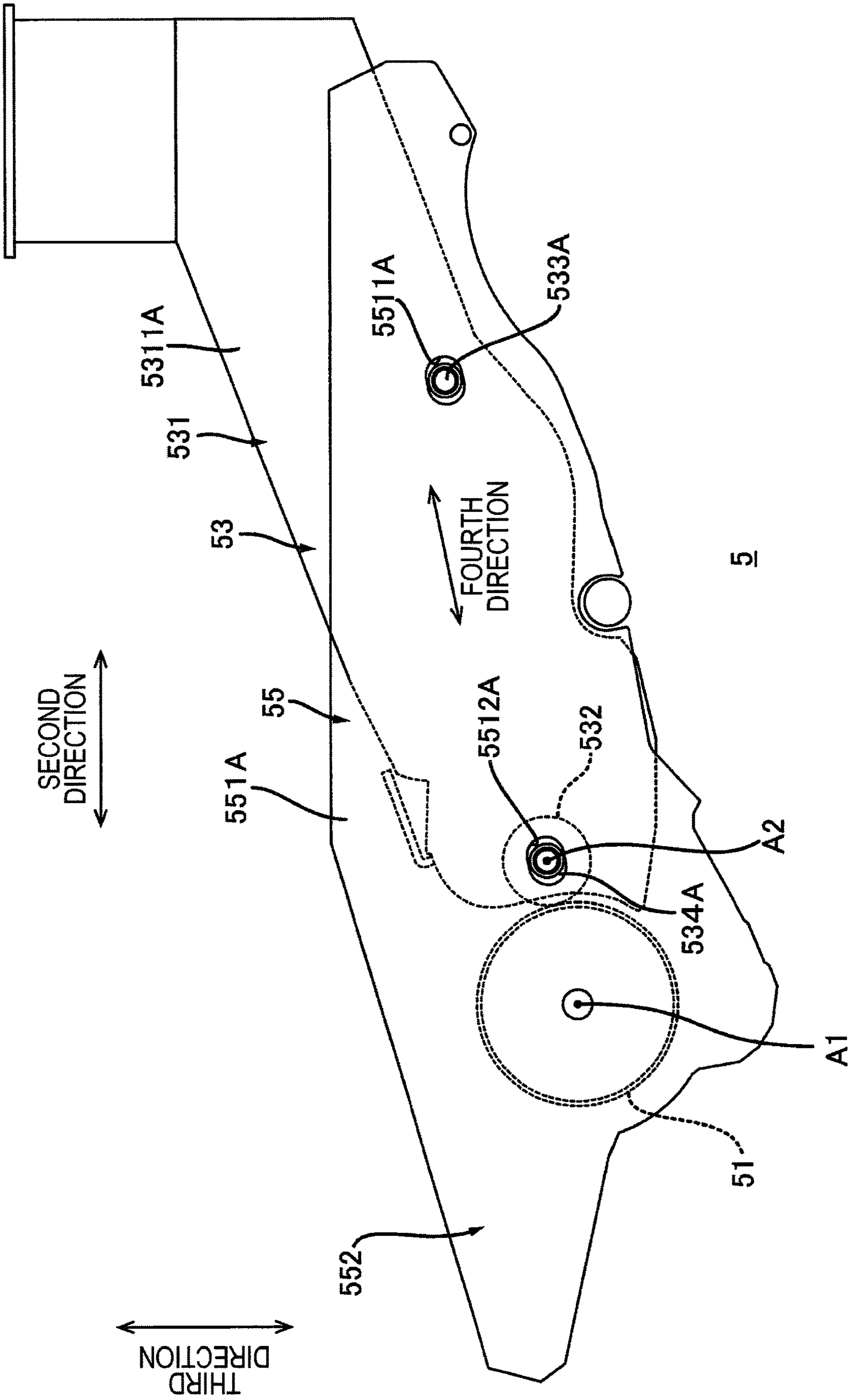
FIG. 8 is a side view of the process cartridge shown in FIG. 6.

As shown in FIG. 6, the side plate 551A is located at one end of the frame 55 in the first direction. The side plate 551A supports one end of the photosensitive drum 51 and one end of the development unit 53. As shown in FIG. 8, the side plate 551A extends in the second direction and a third direction.

The third direction crosses the first direction and the second direction. For example, the third direction is perpendicular to the first direction and the second direction. In a state where the process cartridge 5 is attached to the image forming apparatus 1, the third direction is the same as the upper-lower direction. In a state where the process cartridge 5 is attached to the image forming apparatus 1, one side in the third direction is the upper side, and the other side in the third direction is the lower side.

The side plate 551A has two through holes 5511A and 5512A.

The through hole 5511A is located away from the photosensitive drum 51 in a fourth direction. The fourth direction is the direction connecting the drum axis A1 and the development axis A2. The through hole 5511A extends in the fourth direction. The through hole 5511A is an elongated hole. A protrusion 533A of the development unit 53 fits into the through hole 5511A. The protrusion 533A will be described later.

The through hole 5512A is located away from the through hole 5511A in the fourth direction. The through hole 5512A is located between the photosensitive drum 51 and the through hole 5511A in the fourth direction. The through hole 5512A extends in the fourth direction. The through hole 5512A is an elongated hole. A protrusion 534A of the development unit 53 fits into the through hole 5512A. The protrusion 534A will be described later.

As shown in FIG. 6, the side plate 551B is located at the other end of the frame 55 in the first direction. The side plate 551B is located away from the side plate 551A in the first direction. The side plate 551B extends in the second direction and the third direction. The side plate 551B supports the other end of the photosensitive drum 51 and the other end of the development unit 53. The side plate 551B has two through holes 5511B and 5512B.

The through hole 5511B is located away from the photosensitive drum 51 in the fourth direction (see FIG. 8). The through hole 5511B extends in the fourth direction. The through hole 5511B is an elongated hole. A protrusion 533B of the development unit 53 fits into the through hole 5511B. The protrusion 533B will be described later.

The through hole 5512B is located away from the through hole 5511B in the fourth direction. The through hole 5512B is located between the photosensitive drum 51 and the through hole 5511B in the fourth direction. The through hole 5512B extends in the fourth direction. The through hole 5512B is an elongated hole. A protrusion 534B of the development unit 53 fits into the through hole 5512B. The protrusion 534B will be described later.

2.1.2 Waste Toner Container 552

Figure 7:
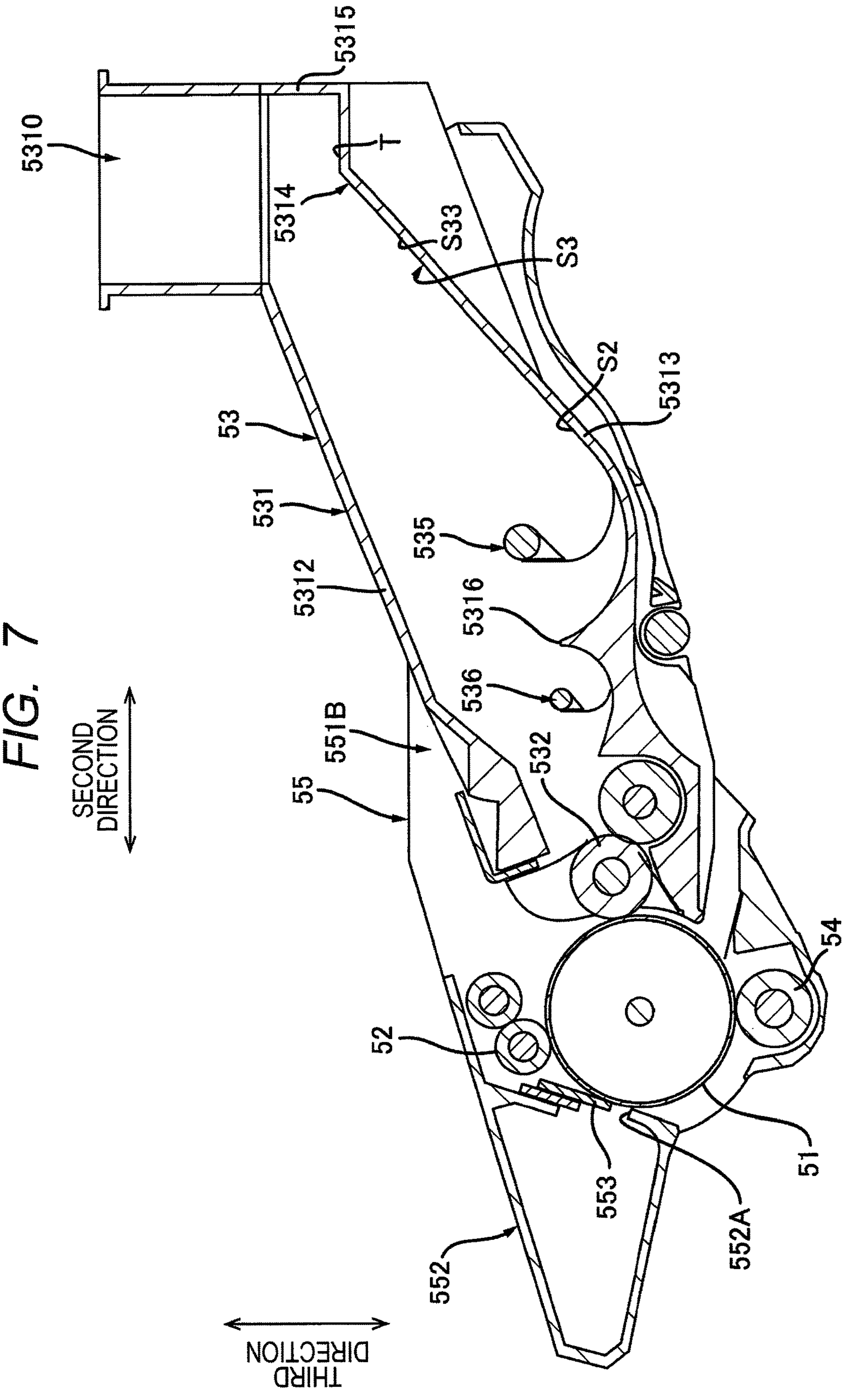
FIG. 7 is a cross-sectional view of the process cartridge shown in FIG. 6, taken along a line VII-VII.

As shown in FIG. 6, the waste toner container 552 is located between the side plate 551A and the side plate 551B in the first direction. The waste toner container 552 extends in the first direction. One end of the waste toner container 552 in the first direction is connected to the side plate 551A. The other end of the waste toner container 552 in the first direction is connected to the side plate 551B. As shown in FIG. 7, the waste toner container 552 has an opening 552A. The waste toner container 552 stores waste toner.

2.1.3 Drum Cleaning Member 553

The drum cleaning member 553 is attached to the waste toner container 552. The drum cleaning member 553 extends in the first direction. The drum cleaning member 553 has a plate shape. The drum cleaning member 553 cleans the circumferential surface of the photosensitive drum 51. Specifically, an edge of the drum cleaning member 553 contacts the surface of the photosensitive drum 51. As the photosensitive drum 51 rotates, the waste toner on the surface of the photosensitive drum 51 contacts the edge of the drum cleaning member 553 and is removed from the surface of the photosensitive drum 51. The removed waste toner is stored in the waste toner container 552 through the opening 552A.

2.2 Details of Development Unit 53

As shown in FIG. 6, the development unit 53 is located between the side plate 551A and the side plate 551B in the first direction. Specifically, the development housing 531 is located between the side plate 551A and the side plate 551B in the first direction. As shown in FIGS. 6 and 7, the development unit 53 includes two protrusions 533A and 534A (see FIG. 6), two protrusions 533B and 534B (see FIG. 6), a first agitator 535 (see FIG. 7), and a second agitator 536 (see FIG. 7) in addition to the development housing 531 and the development roller 532 described above.

2.2.1 Details of Development Housing 531

Figure 9:
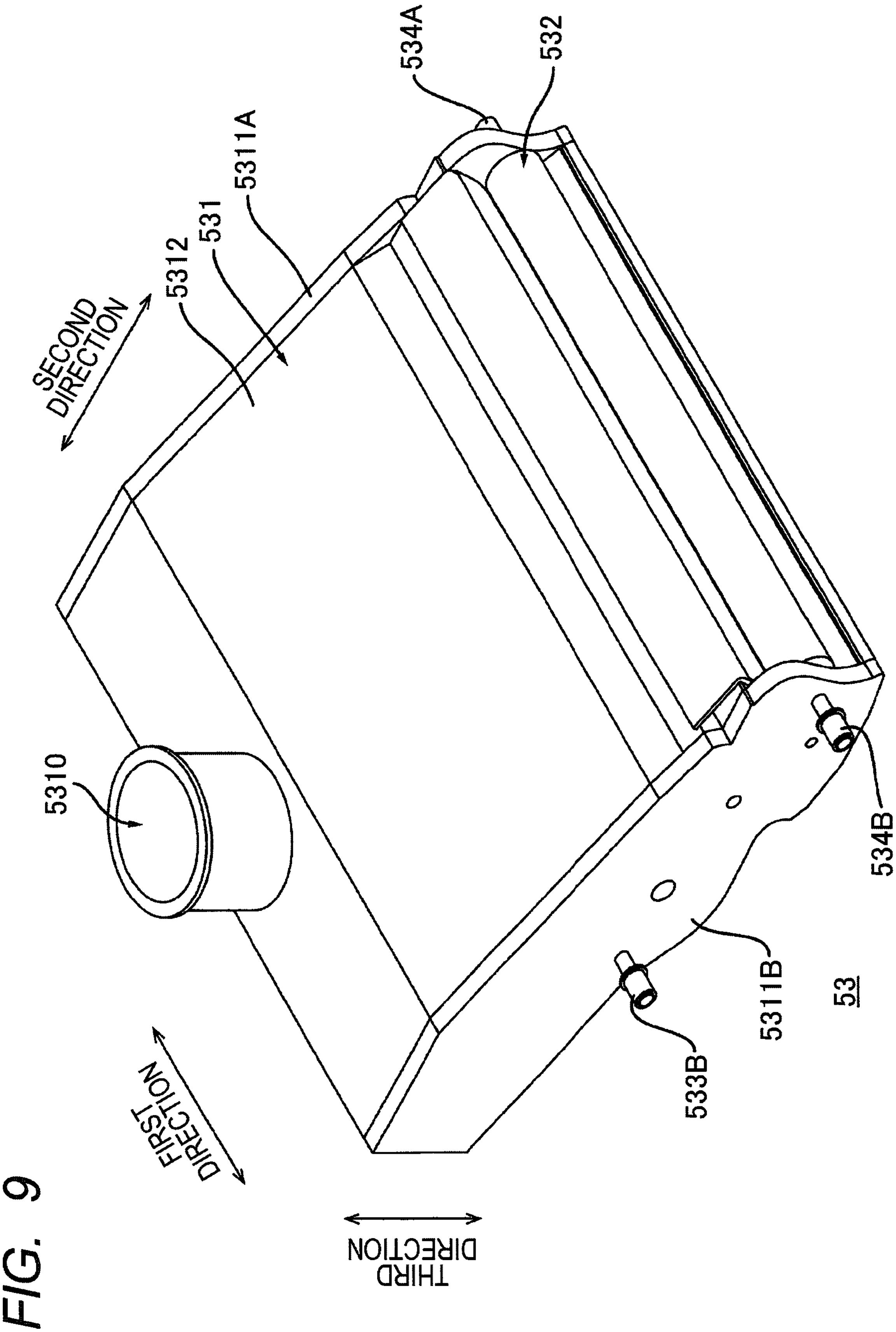
FIG. 9 is a perspective view of a development unit shown in FIG. 6.
Figure 10:
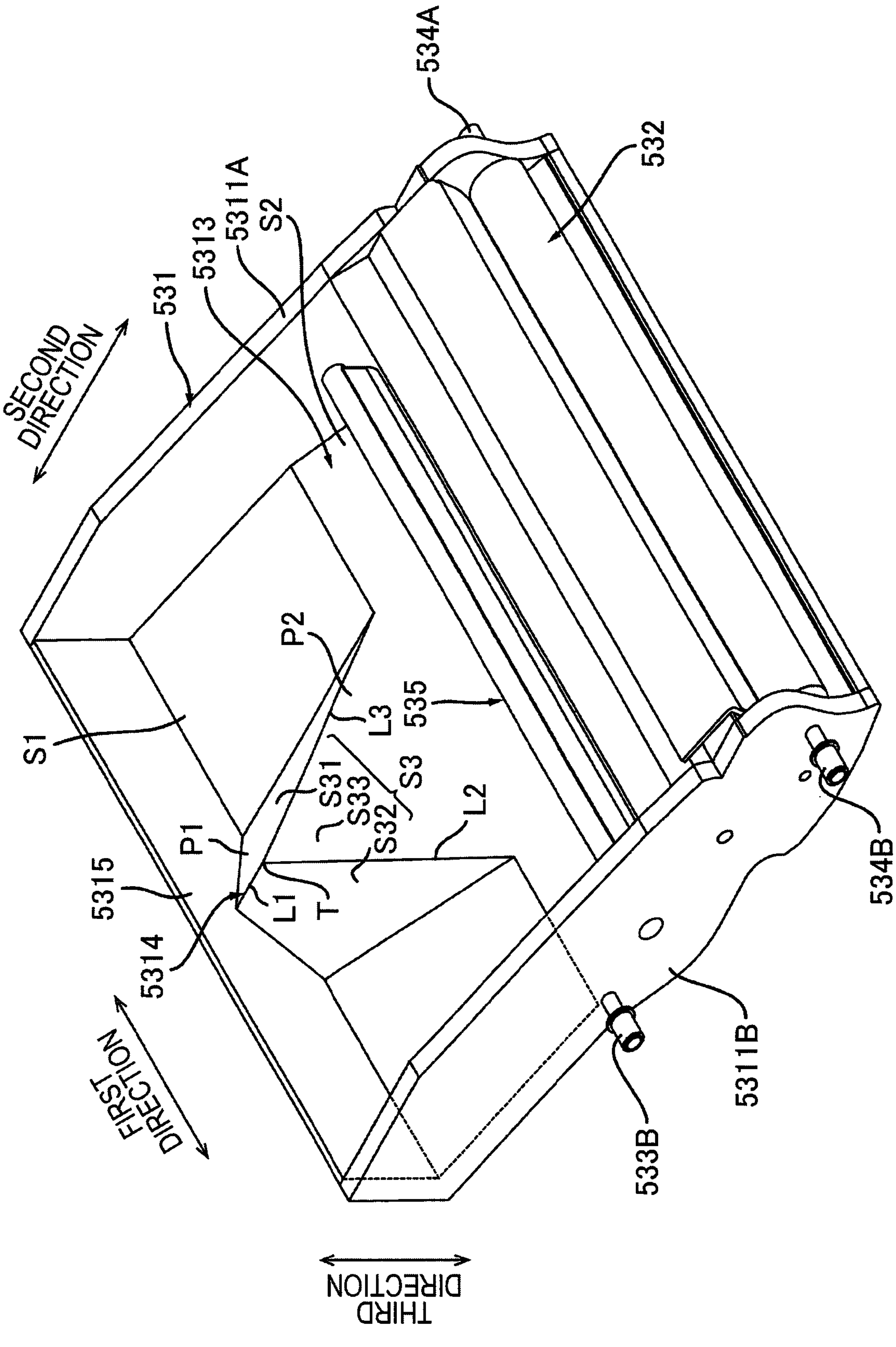
FIG. 10 is an explanatory view for explaining an internal structure of a development housing shown in FIG. 9, showing a state where a first wall is removed.

As shown in FIGS. 9 and 10, the development housing 531 includes two side walls 5311A and 5311B, a first wall 5312 (see FIG. 9), a second wall 5313 (see FIG. 10), a protrusion 5314 (see FIG. 10), a third wall 5315, and a wall 5316 (see FIG. 7).

2.2.1.1 Side Walls 5311A and 5311B

As shown in FIG. 10, the side wall 5311A is located at one end of the development housing 531 in the first direction. The side wall 5311A supports one end of the development roller 532. The side wall 5311A extends in the second direction and the third direction.

The side wall 5311B is located at the other end of the development housing 531 in the first direction. The side wall 5311B is located away from the side wall 5311A in the first direction. The side wall 5311B supports the other end of the development roller 532. The side wall 5311B extends in the second direction and the third direction.

2.2.1.2 First Wall 5312

As shown in FIG. 9, the first wall 5312 is located between the side wall 5311A and the side wall 5311B in the first direction. The first wall 5312 extends in the first direction and the second direction. One end of the first wall 5312 in the first direction is connected to the side wall 5311A. The other end of the first wall 5312 in the first direction is connected to the side wall 5311B. As shown in FIG. 7, the first wall 5312 is located at one end of the development housing 531 in the third direction. As shown in FIGS. 7 and 9, the first wall 5312 has a reception port 5310. In other words, the development housing 531 has the reception port 5310.

As shown in FIG. 9, the reception port 5310 is located away from the development roller 532 in the second direction. The reception port 5310 is located at the other end of the development housing 531 in the second direction. The reception port 5310 is located at a center portion of the development housing 531 in the first direction. The reception port 5310 is not limited to this configuration. In this embodiment, the reception port 5310 has a circular shape.

As shown in FIG. 1, in a state where the process cartridge 5 is attached to the image forming apparatus 1, the reception port 5310 is located on the opposite side of the fuser 7 with respect to the exposure device 6 in the second direction. In a state where the process cartridge 5 is attached to the image forming apparatus 1, the reception port 5310 faces upward. As shown in FIG. 3, in a state where the process cartridge 5 is attached to the image forming apparatus 1, the second cover 32 is located at the second cover open position, and the toner container B is connected to the reception port 5310, the reception port 5310 receives toner from the toner container B.

2.2.1.3 Second Wall 5313

As shown in FIG. 7, the second wall 5313 is located on the other side of the first wall 5312 in the third direction. The second wall 5313 is located away from the first wall 5312 in the third direction. In a state where the process cartridge 5 is attached to the image forming apparatus 1, the second wall 5313 is located below the first wall 5312. As shown in FIG. 10, the second wall 5313 is located between the side wall 5311A and the side wall 5311B in the first direction. The second wall 5313 extends in the first direction and the second direction. One end of the second wall 5313 in the first direction is connected to the side wall 5311A. The other end of the second wall 5313 in the first direction is connected to the side wall 5311B. The second wall 5313 has a first inner surface S1 and a second inner surface S2.

The first inner surface S1 is located at the other end of the second wall 5313 in the second direction. The first inner surface S1 is located away from the development roller 532 in the second direction. The first inner surface S1 extends in the first direction. Toward the development roller 532, the first inner surface S1 separates farther from the first wall 5312. In a state where the reception port 5310 faces upward, the first inner surface S1 slopes downward toward the development roller 532. In a state where the reception port 5310 faces upward, the gradient of the first inner surface S1 is greater than an angle of repose of the toner.

The second inner surface S2 is located between the first inner surface S1 and the development roller 532 in the second direction. The second inner surface S2 extends in the first direction. Toward the development roller 532, the second inner surface S2 separates farther from the first wall 5312. In a state where the reception port 5310 faces upward, the second inner surface S2 slopes downward toward the development roller 532. In a state where the reception port 5310 faces upward, the gradient of the second inner surface S2 is greater than the angle of repose of the toner. In a state where the reception port 5310 faces upward, the gradient of the second inner surface S2 is greater than the gradient of the first inner surface S1.

2.2.1.4 Protruding Portion 5314

The protruding portion 5314 is located below the reception port 5310 (see FIG. 9) inside the development housing 531. The protruding portion 5314 protrudes from the first inner surface S1 of the second wall 5313 toward the first wall 5312 (see FIG. 9) in the third direction. The protruding portion 5314 has an apex T and a slope S3. That is, the development housing 531 has the slope S3. The slope S3 is located below the reception port 5310 inside the development housing 531. In this embodiment, the slope S3 includes two first slopes S31 and S32 and a second slope S33. The protruding portion 5314 has a triangular pyramid shape including the first slopes S31 and S32 and the second slope S33.

The apex T is located at one end of the protruding portion 5314 in the third direction. The apex T is located away from the first inner surface S1 of the second wall 5313 in the third direction. The apex T is the intersection of a line L1 where the first slope S31 and the first slope S32 intersect, a line L2 where the first slope S32 and the second slope S33 intersect, and a line L3 where the first slope S31 and the second slope S33 intersect. As shown in FIG. 6, when the protruding portion 5314 is viewed from above through the reception port 5310, the apex T is located within the reception port 5310.

As shown in FIG. 10, the first slope S31 is a side surface of the protruding portion 5314 on one side in the first direction. The first slope S31 is located between the apex T and the side wall 5311A in the first direction. In a state where the reception port 5310 faces upward, the first slope S31 slopes downward from the apex T toward the side wall 5311A. In other words, in a state where the reception port 5310 faces upward, the first slope S31 slopes downward away from the reception port 5310 in the first direction. That is, the slope S3 includes a first slope portion P1 that slopes downward away from the reception port 5310 in the first direction, and the first slope S31 serves as the first slope portion P1. In a state where the reception port 5310 faces upward, the gradient of the first slope S31 is greater than the angle of repose of the toner. That is, in a state where the reception port 5310 faces upward, the gradient of the first slope portion P1 is greater than the angle of repose of the toner. The first slope S31 extends in the second direction. The first slope S31 is a flat surface. The upper end of the first slope S31 is connected to the first slope S32. The lower end of the first slope S31 is connected to the first inner surface S1 of the second wall 5313. One end of the first slope S31 in the second direction is connected to the second slope S33.

The first slope S32 is the side surface on the other side of the protruding portion 5314 in the first direction. The first slope S32 is located between the apex T and the side wall 5311B in the first direction. In a state where the reception port 5310 faces upward, the first slope S32 slopes downward from the apex T toward the side wall 5311B. In other words, in a state where the reception port 5310 faces upward, the first slope S32 slopes downward away from the reception port 5310 in the first direction. The gradient of the first slope S32 is greater than the angle of repose of the toner. The first slope S32 extends in the second direction. The first slope S32 is a flat surface. The upper end of the first slope S32 is connected to the first slope S31. The lower end of the first slope S32 is connected to the first inner surface S1 of the second wall 5313. One end of the first slope S32 in the second direction is connected to the second slope S33.

The second slope S33 is a side surface of the protruding portion 5314 on one side in the second direction. The second slope S33 is located between the apex T and the development roller 532 in the second direction. In a state where the reception port 5310 faces upward, the second slope S33 slopes downward from the apex T toward the development roller 532. That is, the slope S3 includes a second slope portion P2 that slopes downward toward the development roller 532 in the second direction, and the second slope S33 serves as the second slope portion P2. In a state where the reception port 5310 faces upward, the gradient of the second slope S33 is greater than the angle of repose of the toner. That is, the gradient of the second slope portion P2 is greater than the angle of repose of the toner. In the present embodiment, the gradient of the second slope S33 is the same as the gradient of the second inner surface S2 of the second wall 5313. The second slope S33 extends in the first direction. The second slope S33 is a flat surface. One end of the second slope S33 in the first direction is connected to the first slope S31. The other end of the second slope S33 in the first direction is connected to the first slope S32. The lower end of the second slope S33 is connected to the second inner surface S2 of the second wall 5313.

2.2.1.5 Third Wall 5315

The third wall 5315 is located at the other end of the development housing 531 in the second direction. The third wall 5315 is located between the first wall 5312 and the second wall 5313 in the third direction. The third wall 5315 extends in the first direction and the third direction.

2.2.1.6 Wall 5316

As shown in FIG. 7, the wall 5316 is located within the development housing 531. The wall 5316 is located between the protruding portion 5314 and the development roller 532 in the second direction. The wall 5316 is located between the slope S3 and the development roller 532 in the second direction. In a state where the reception port 5310 faces upward, the wall 5316 protrudes upward from the second wall 5313 toward the first wall 5312. The wall 5316 extends in the first direction.

2.2.2 Protrusions 533A and 534A

As shown in FIG. 6, the protrusion 533A is located away from the photosensitive drum 51 in the fourth direction (see FIG. 8). The protrusion 533A is located at one end of the development unit 53 in the first direction. The protrusion 533A extends in the first direction. In this embodiment, the protrusion 533A extends from one outer surface of the development housing 531 in the first direction. The protrusion 533A may be attached to one outer surface of the development housing 531 in the first direction. The protrusion 533A has a cylindrical shape. The protrusion 533A fits into the through hole 5511A of the side plate 551A.

The protrusion 534A is located between the photosensitive drum 51 and the protrusion 533A in the fourth direction. The protrusion 534A is located at one end of the development unit 53 in the first direction. The protrusion 534A extends in the first direction. In this embodiment, the protrusion 534A extends from one outer surface of the development housing 531 in the first direction. The protrusion 534A may be attached to one outer surface of the development housing 531 in the first direction. The protrusion 534A has a cylindrical shape. The protrusion 534A may be one end of a shaft of the development roller 532. The protrusion 534A fits into the through hole 5512A of the side plate 551A.

2.2.3 Protrusions 533B and 534B

The protrusion 533B is located away from the photosensitive drum 51 in the fourth direction. The protrusion 533B is located at the other end of the development unit 53 in the first direction. The protrusion 533B extends in the first direction. In this embodiment, the protrusion 533B extends from the other outer surface of the development housing 531 in the first direction. The protrusion 533B may be attached to the other outer surface of the development housing 531 in the first direction. The protrusion 533B has a cylindrical shape. The protrusion 533B fits into the through hole 5511B of the side plate 551B.

The protrusion 534B is located between the photosensitive drum 51 and the protrusion 533B in the fourth direction. The protrusion 534B is located at the other end of the development unit 53 in the first direction. The protrusion 534B extends in the first direction. In this embodiment, the protrusion 534B extends from the other outer surface of the development housing 531 in the first direction. The protrusion 534B may be attached to the other outer surface of the development housing 531 in the first direction. The protrusion 534B has a cylindrical shape. The protrusion 534B may be the other end of the shaft of the development roller 532. The protrusion 534B fits into the through hole 5512B of the side plate 551B.

In a state where the protrusion 533A fits into the through hole 5511A of the side plate 551A, the protrusion 534A fits into the through hole 5512A of the side plate 551A, the protrusion 533B fits into the through hole 5511B of the side plate 551B, and the protrusion 534B fits into the through hole 5512B of the side plate 551B, the development unit 53 is movable relative to the photosensitive drum 51.

2.2.4 First Agitator 535

As shown in FIG. 7, the first agitator 535 is located inside the development housing 531. The first agitator 535 is located between the protruding portion 5314 and the wall 5316 in the second direction. The first agitator 535 is located between the slope S3 and the development roller 532 in the second direction. The first agitator 535 conveys the toner in the development housing 531 toward the development roller 532.

2.2.5 Second Agitator 536

The second agitator 536 is located inside the development housing 531. The second agitator 536 is located between the wall 5316 and the developer roller 532 in the second direction. The second agitator 536 is located between the first agitator 535 and the development roller 532 in the second direction. The second agitator 536 conveys the toner in the development housing 531 toward the development roller 532 in cooperation with the first agitator 535.

3. EFFECTS (1) According to the image forming apparatus 1 and the process cartridge 5, as shown in FIG. 10, the development unit 53 includes the slope S3 located below the reception port 5310 (see FIG. 9) in the development housing 531. The slope S3 includes the first slopes S31 and S32 and the second slope S33. Each of the first slopes S31 and S32 slopes downward away from the reception port 5310 in the first direction. The second slope S33 slopes downward toward the development roller 532 in the second direction.

Thus, the toner supplied into the development housing 531 through the reception port 5310 flows in directions away from the reception port 5310 in the first direction due to the slope S3 located below the reception port 5310 and flows in a direction toward the development roller 532 in the second direction.

Thus, by supplying toner from the reception port 5310 into the development housing 531, the toner flows toward the development roller 532 while being distributed throughout the entirety of the development housing 531 in the first direction.

As a result, it is unnecessary to spread the toner to the entirety of the development housing 531 after the toner is supplied, and the development unit 53 is smoothly supplied with toner.

(2) According to the image forming apparatus 1 and the process cartridge 5, the gradient of the first slopes S31 and S32 is greater than the angle of repose of the toner.

Thus, the first slopes S31 and S32 allow the toner to flow in the first direction.

(3) According to the image forming apparatus 1 and the process cartridge 5, the gradient of the second slope S33 is greater than the angle of repose of the toner.

Thus, the second slope S33 allows the toner to flow in the second direction.

(4) According to the image forming apparatus 1 and the process cartridge 5, as shown in FIG. 7, the development housing 531 includes the wall 5316 located between the slope S3 and the development roller 532 in the second direction.

Thus, the wall 5316 suppresses that the toner flowed toward the development roller 532 on the slope S3 leaks out from the periphery of the development roller due to the momentum of the toner.

(5) According to the image forming apparatus 1 and the process cartridge 5, as shown in FIG. 9, the reception port 5310 is located at a center portion of the development housing 531 in the first direction.

Thus, the toner flows from the center portion of the development housing 531 toward both sides in the first direction.

This suppresses unevenness in the amount of toner in the development housing 531 in the first direction.

(6) According to the image forming apparatus 1 and the process cartridge 5, as shown in FIG. 6, when the protruding portion 5314 is viewed from above through the reception port 5310, the apex T of the protruding portion 5314 is located within the reception port 5310.

Thus, the toner supplied into the development housing 531 through the reception port 5310 reliably hits the slope S3.

4. MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below. Modifications will be described with reference to FIGS. 11 to 23. In the description of the modifications, the same reference numerals are given to the same members as in the above-described embodiment, and the descriptions thereof are omitted.

Figure 11:
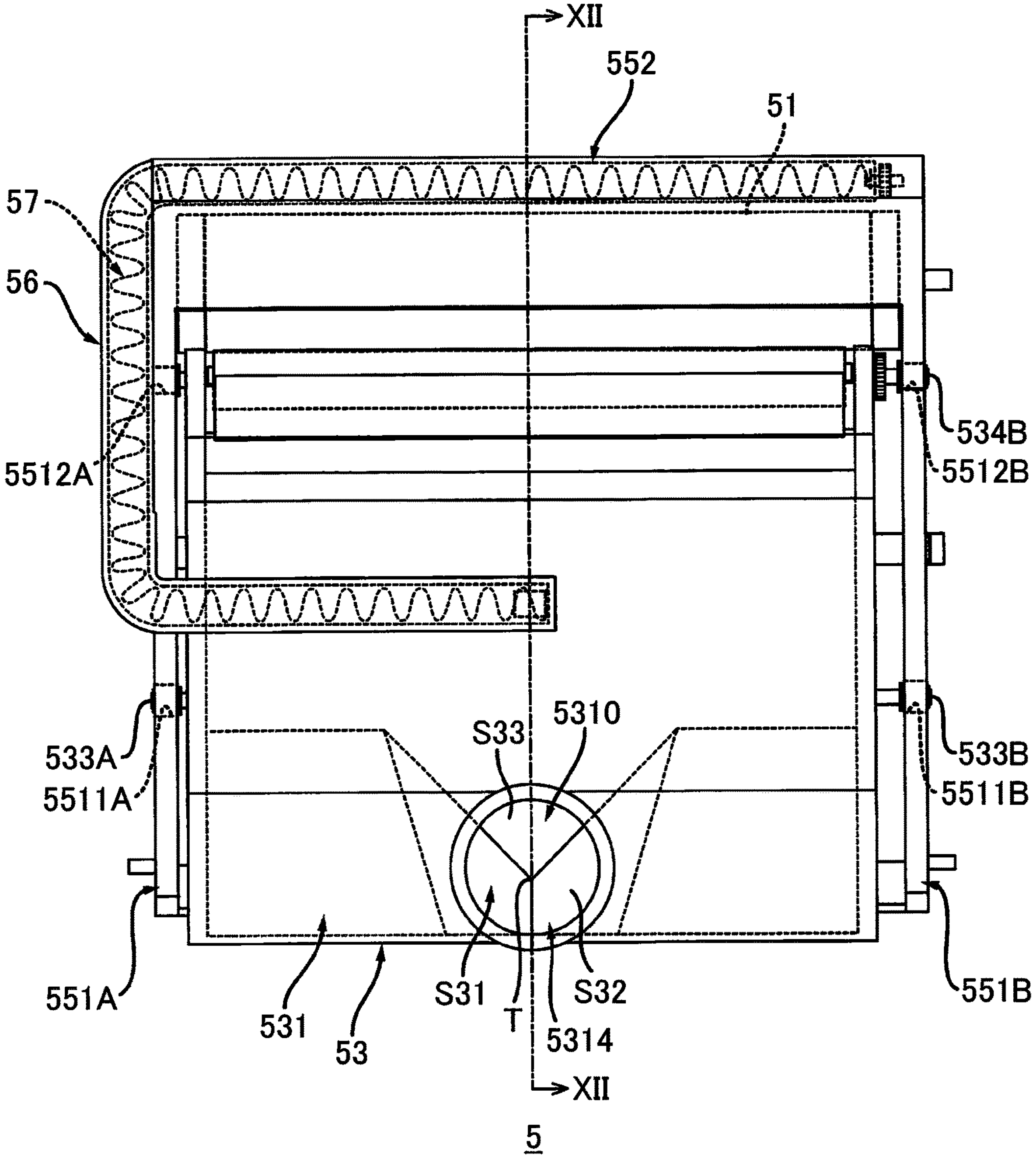
FIG. 11 is a plan view of a process cartridge.

(1) As shown in FIG. 11, the process cartridge 5 may be configured to recover waste toner in the waste toner container 552 into the development housing 531. In this case, the process cartridge 5 mixes the collected waste toner with the toner in the development housing 531 and uses the mixed toner again for image formation. Specifically, the process cartridge 5 includes a waste toner pipe 56, a conveyance member 57, and a seal member 58 (see FIG. 12).

Figure 12:
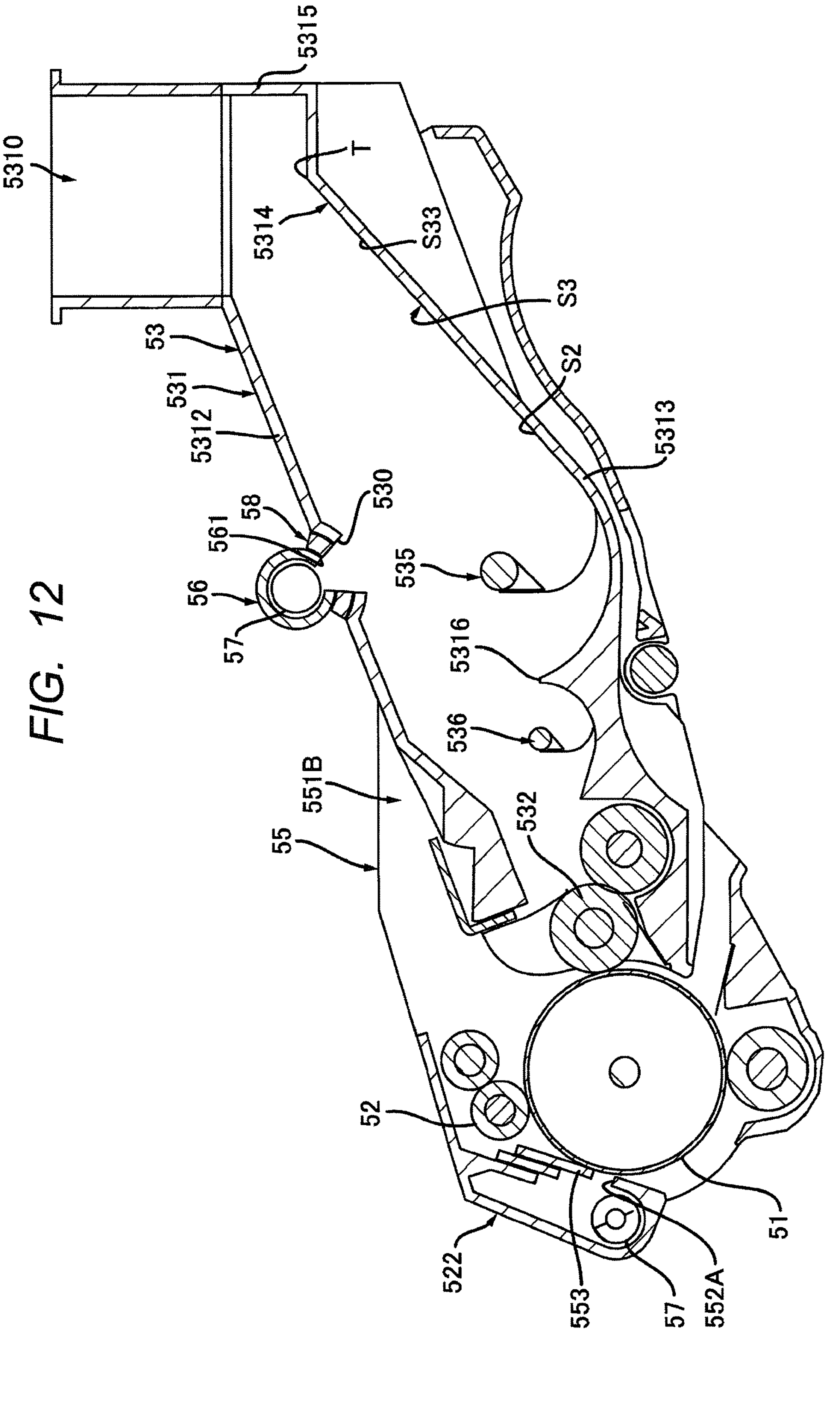
FIG. 12 is a cross-sectional view of the process cartridge shown in FIG. 11, taken along a line XII-XII.

One end of the waste toner pipe 56 is connected to the waste toner container 552. The other end of the waste toner pipe 56 is connected to a center portion of the development housing 531 in the first direction via the seal member 58. The other end of the waste toner pipe 56 is located between the reception port 5310 and the development roller 532 in the second direction. More specifically, the other end of the waste toner pipe 56 is located between the reception port 5310 and the wall 5316 (see FIG. 12) in the second direction. As shown in FIG. 12, the waste toner pipe 56 has a waste toner discharge port 561. The waste toner discharge port 561 discharges the toner in the waste toner pipe 56. The waste toner discharge port 561 communicates with a waste toner reception port 530 of the development housing 531. With this configuration, the waste toner discharged from the waste toner discharge port 561 passes through the waste toner reception port 530 and enters the development housing 531.

The conveyance member 57 is located inside the waste toner container 552 and the waste toner pipe 56. The conveyance member 57 conveys the waste toner in the waste toner container 552 toward the waste toner discharge port 561. The conveyance member 57 is a shaftless screw, for example.

As shown in FIG. 12, the seal member 58 is located between the other end of the waste toner pipe 56 and the development housing 531. The seal member 58 is located around the waste toner discharge port 561 of the waste toner pipe 56 and the waste toner reception port 530 of the development housing 531. The seal member 58 seals between the other end of the waste toner pipe 56 and the development housing 531.

In this modification, too, effects similar to those of the above-described embodiment are obtained. According to this modification, waste toner is reused for image formation. At that time, the wall 5316 suppresses the waste toner being directly supplied to the development roller 532. Thus, the waste toner is mixed with new toner supplied from the toner reception port 5310 and then supplied to the development roller 532. This suppresses an influence of the waste toner on the print quality.

Figure 13:
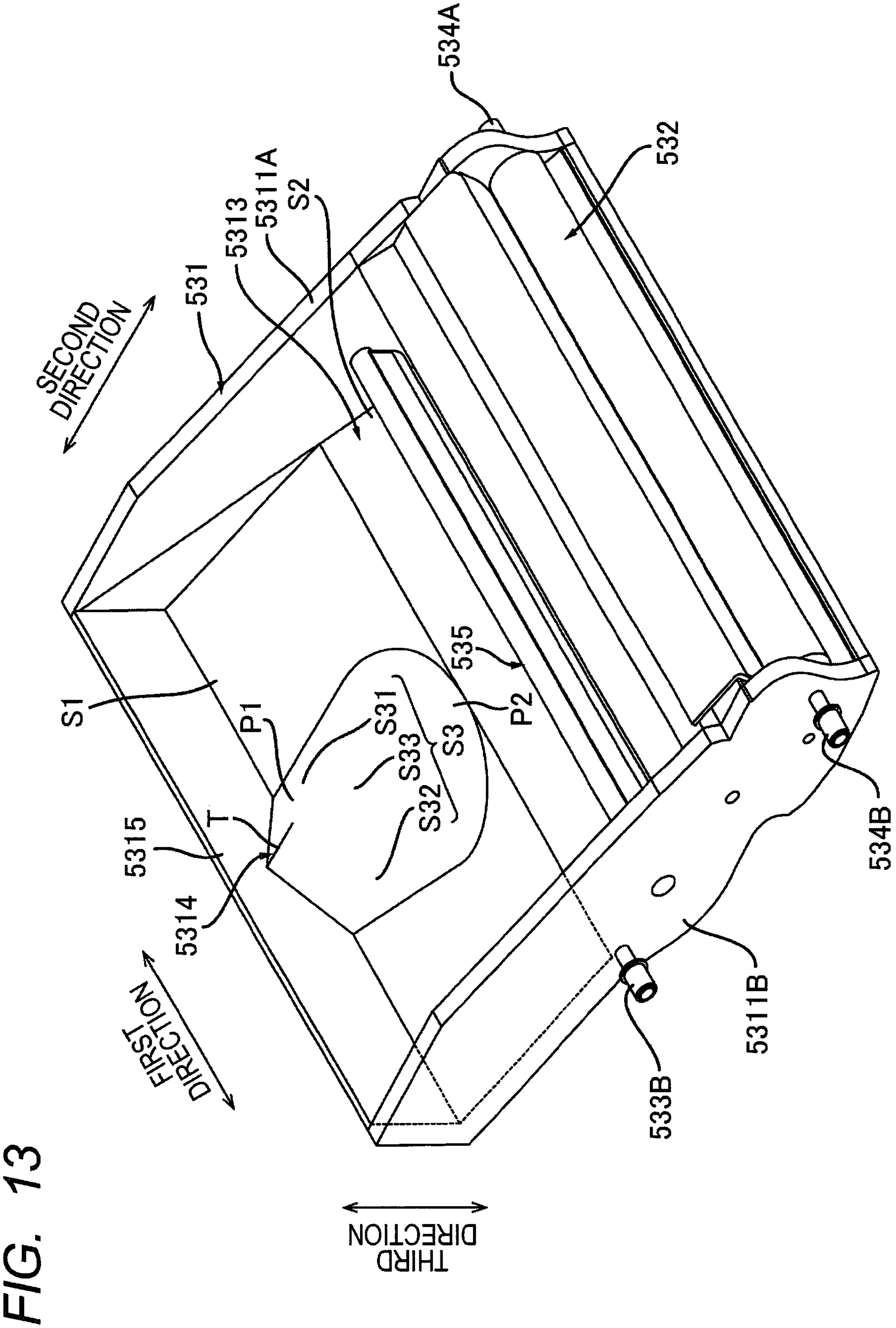
FIG. 13 is an explanatory view for explaining an internal structure of a development housing of a process cartridge, showing a state where a first wall is removed.

(2) The shape of the protruding portion 5314 is not limited. For example, as shown in FIG. 13, the slope S3 may be a curved surface. Specifically, in this modification, the second slope S33 is a curved surface having the same shape as a surface of a cone. No side is formed at the connection portion between the first slope S31 and the second slope S33 and at the connection portion between the first slope S32 and the second slope S33. That is, the slope S3 is configured as one curved surface including the two first slopes S31 and S32 and the second slope S33. As described above, each of the first slopes S31 and S32 slopes downward away from the reception port 5310 in the first direction. Thus, the slope S3 includes the first slope portion P1. The second slope S33 slopes downward toward the development roller 532 in the second direction. Thus, the slope S3 includes the second slope portion P2.

In this modification, too, effects similar to those of the above-described embodiment are obtained.

(3) In a state where the process cartridge 5 is attached to the image forming apparatus 1, the reception port 5310 does not necessarily need to face upward.

Figure 14:
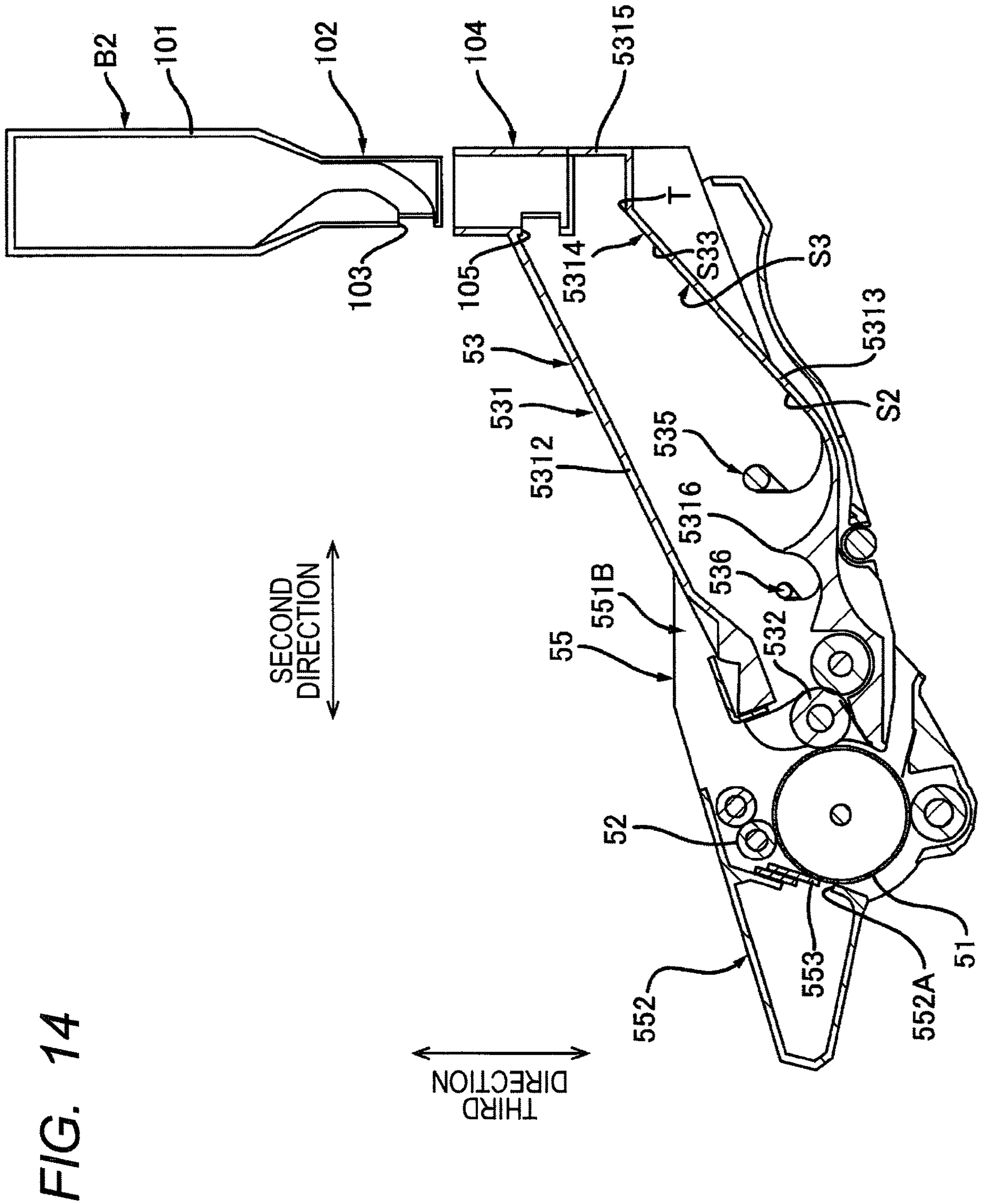
FIG. 14 is an explanatory diagram for explaining a process cartridge.

For example, as shown in FIG. 14, a toner container B2 includes a main body 101, an insertion portion 102 extending from the main body 101, and a discharge port 103. The insertion portion 102 has a cylindrical shape. The insertion portion 102 has the discharge port 103. The discharge port 103 faces in a direction crossing the direction in which the insertion portion 102 extends.

The process cartridge 5 includes a reception portion 104 configured to receive the insertion portion 102 instead of the reception port 5310 described above.

Figure 15:
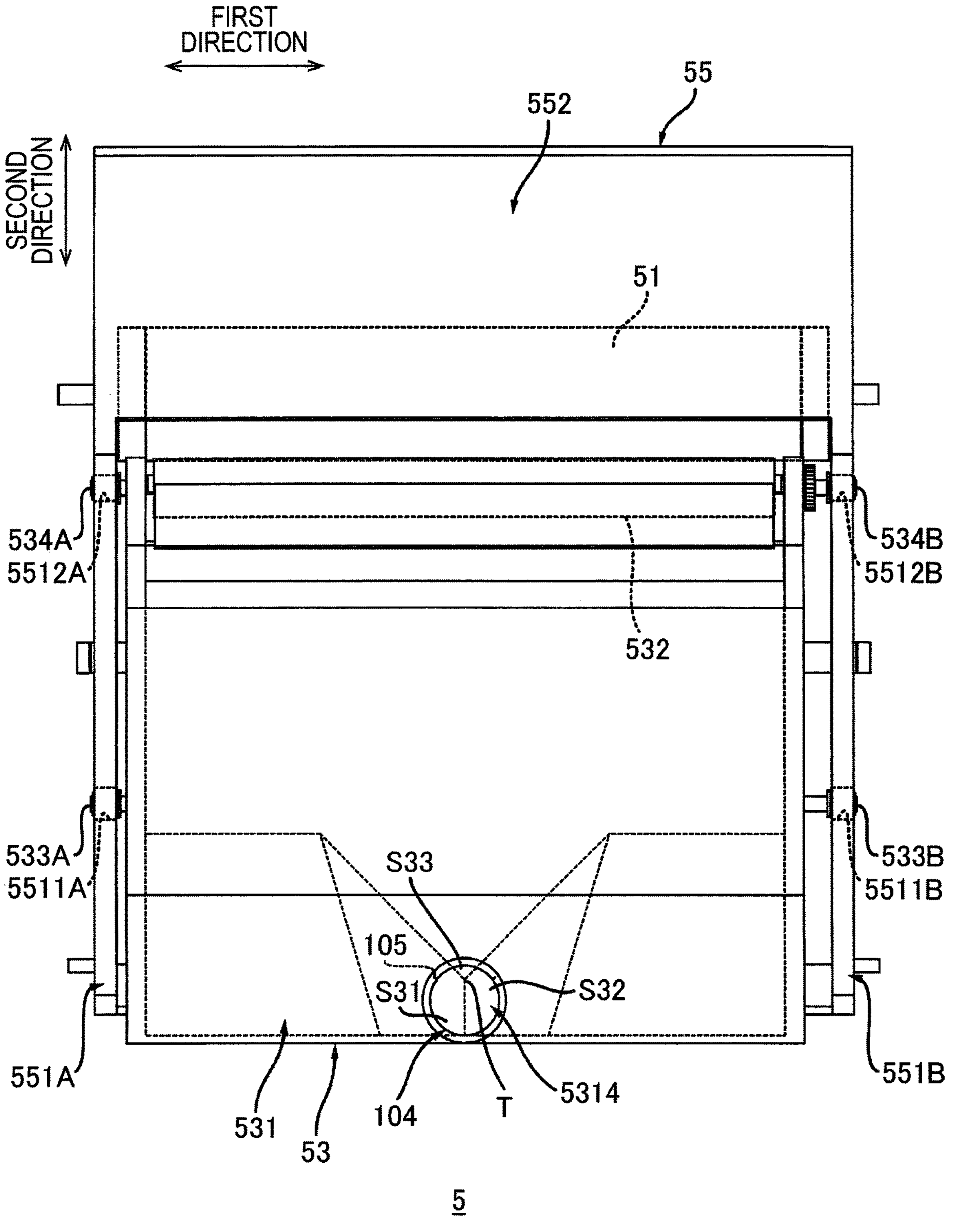
FIG. 15 is a plan view of the process cartridge shown in FIG. 14.

As shown in FIG. 15, the reception portion 104 is located at the other end of the development housing 531 in the second direction. The reception portion 104 is located at a center portion of the development housing 531 in the first direction. As shown in FIG. 14, the reception portion 104 is located on one side of the protruding portion 5314 in the third direction. The reception portion 104 extends in the third direction. The reception portion 104 has a cylindrical shape. The reception portion 104 has a reception port 105. The reception port 105 is located within the reception portion 104. The reception port 105 communicates with the internal space of the development housing 531. The reception port 105 faces in a direction crossing the direction in which the reception portion 104 extends. More specifically, the reception port 105 faces one side in the second direction. In a state where the toner container B2 is inserted, as shown in FIG. 14, the reception port 105 communicates with the discharge port 103 of the toner container B2.

In this modification, too, effects similar to those of the above-described embodiment are obtained.

Figure 16:
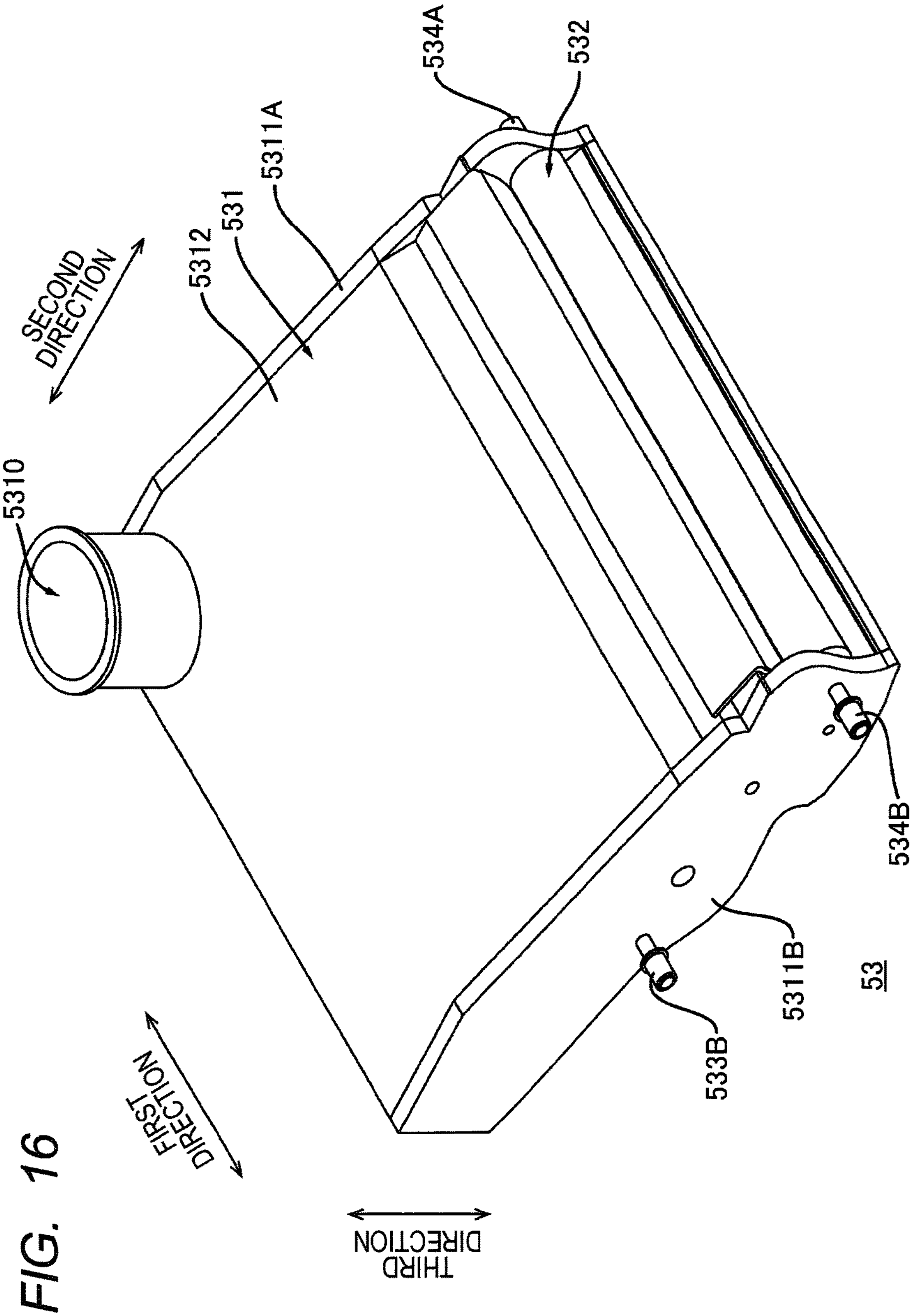
FIG. 16 is a perspective view of a process cartridge.

(4) As shown in FIG. 16, the reception port 5310 may be located at an end of the development housing 531 in the first direction. Specifically, the reception port 5310 is located at one end of the development housing 531 in the first direction.

Figure 17:
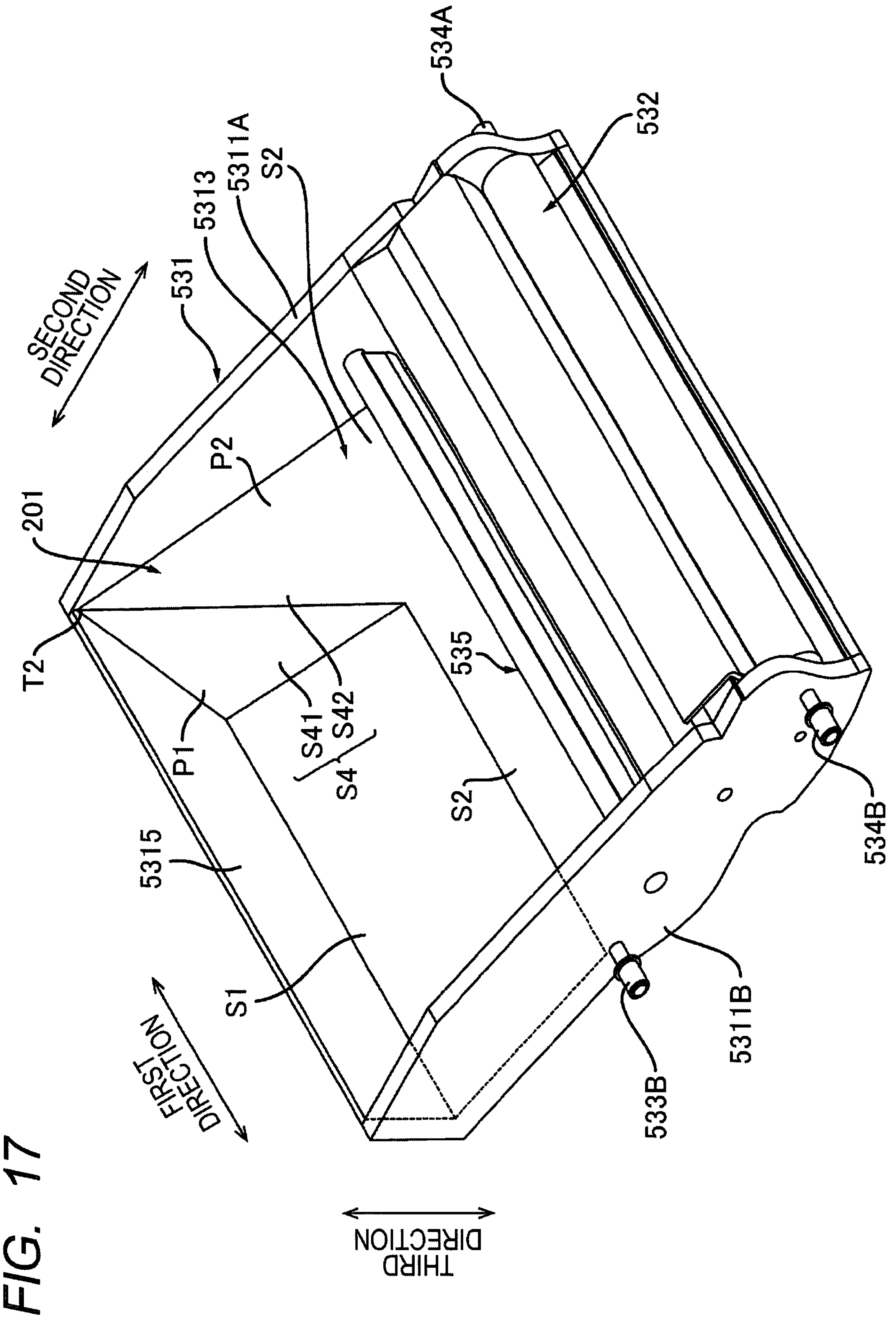
FIG. 17 is an explanatory diagram for explaining an internal structure of a development housing of the process cartridge shown in FIG. 16, showing a state where a first wall is removed.

In this case, as shown in FIG. 17, a protruding portion 201 is also located at one end of the development housing 531 in the first direction. The protruding portion 201 is located on the other side of reception port 5310 in the third direction. In a state where the reception port 5310 faces upward, the protruding portion 201 is located below the reception port 5310. The protruding portion 201 has an apex T2 and a slope S4. In a state where the reception port 5310 faces upward, the slope S4 is located below the reception port 5310 (see FIG. 16). In this modification, the slope S4 includes a first slope S41 and a second slope S42.

In a state where the reception port 5310 faces upward, the first slope S41 slopes downward away from the reception port 5310 in the first direction. That is, the slope S4 includes the first slope portion P1, and the first slope S41 serves as the first slope portion P1. In a state where the reception port 5310 faces upward, the gradient of the first slope S41 is greater than the angle of repose of the toner.

In a state where the reception port 5310 faces upward, the second slope S42 slopes downward toward the development roller 532 in the second direction. That is, the slope S4 includes the second slope portion P2, and the second slope S42 serves as the second slope portion P2. In a state where the reception port 5310 faces upward, the gradient of the second slope S42 is greater than the angle of repose of the toner.

In this modification, too, effects similar to those of the above-described embodiment are obtained.

Figure 18:
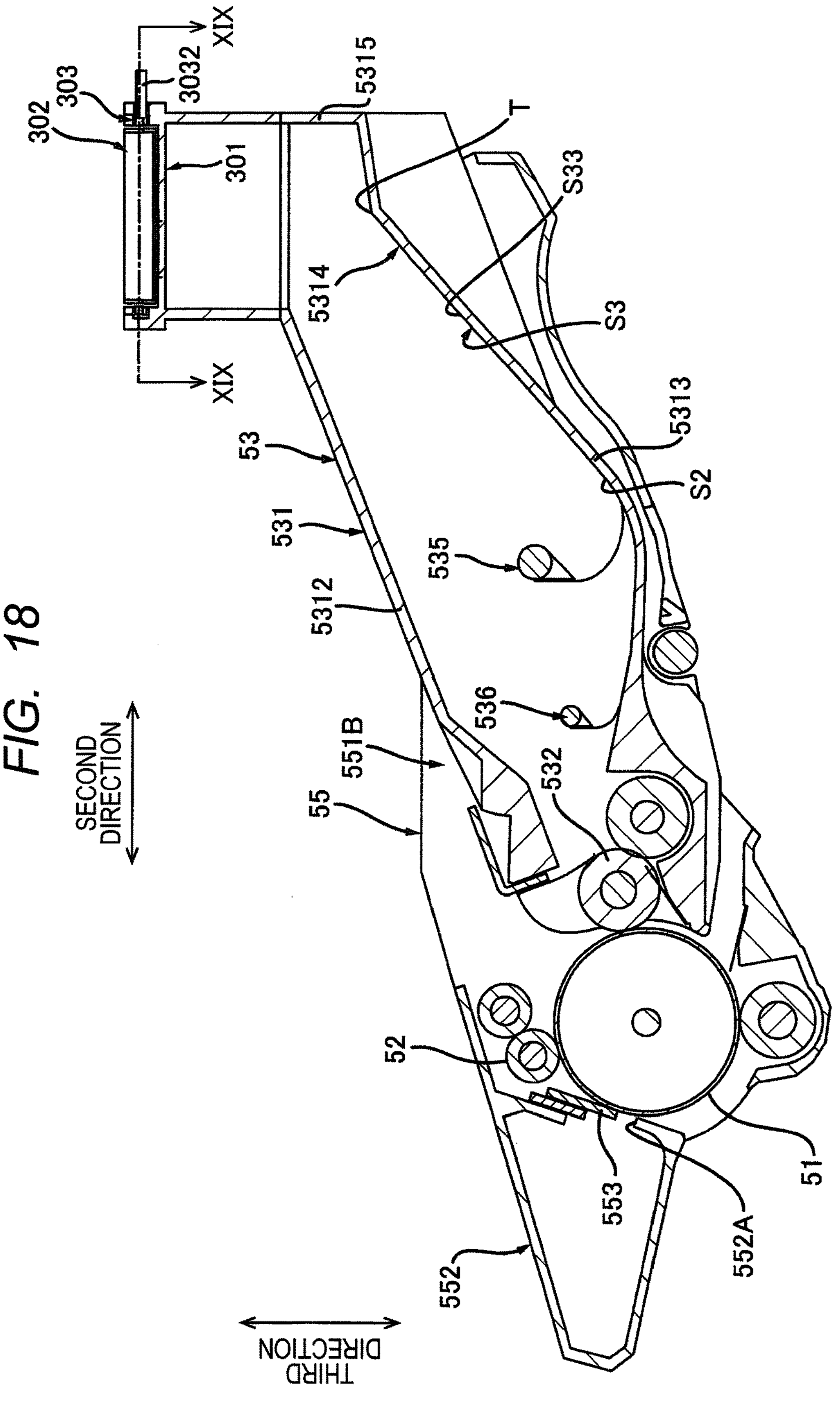
FIG. 18 is an explanatory diagram for explaining a process cartridge.

(5) As shown in FIG. 18, the development housing 531 may include a reception portion 301 instead of the reception port 5310.

Figure 19:
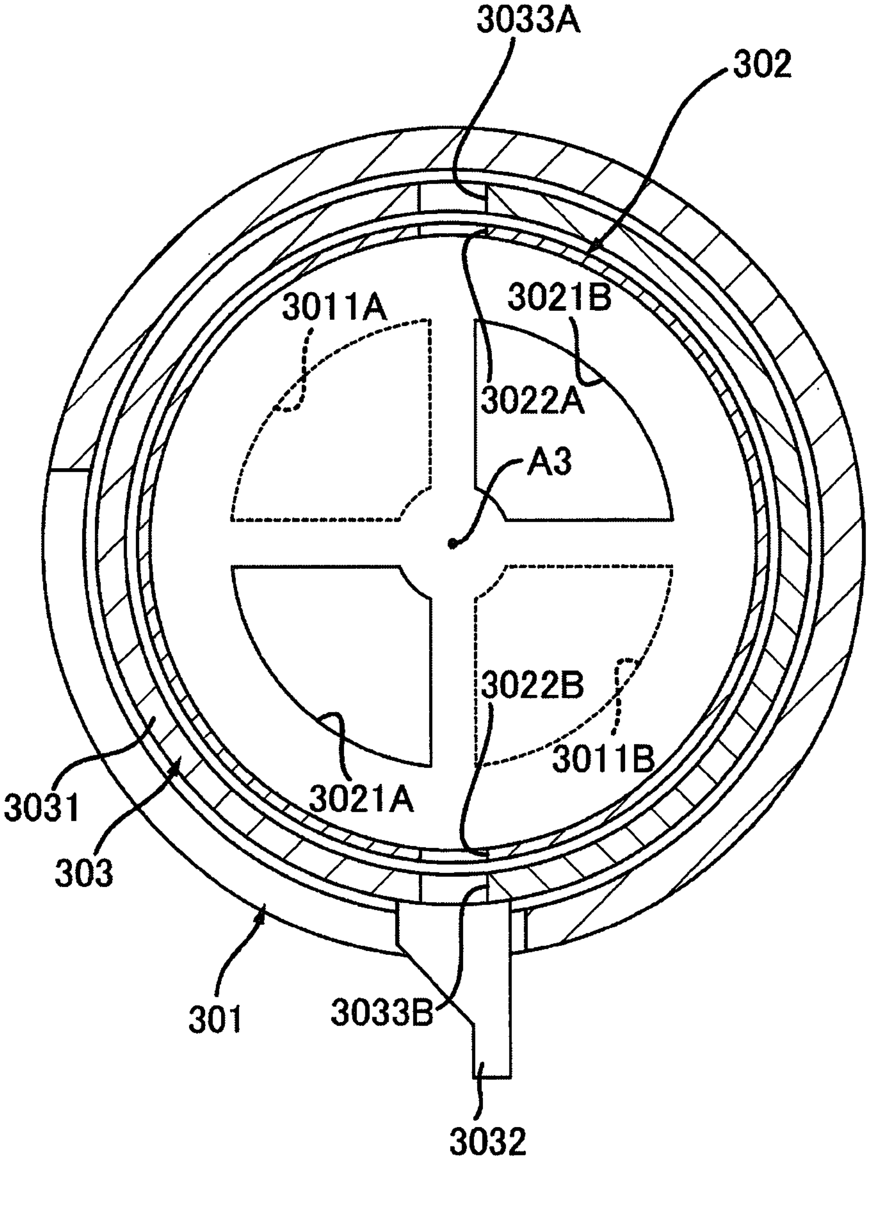
FIG. 19 is a cross-sectional view taken along a line XIX-XIX of FIG. 18, showing a state where a shutter is located at a shutter closed position.

As shown in FIG. 19, the reception portion 301 has a cylindrical shape with a bottom wall. The reception portion 301 extends in the third direction. The reception portion 301 has a plurality of reception ports 3011A and 3011B. The reception ports 3011A and 3011B are located on the bottom wall of the reception portion 301. The reception ports 3011A and 3011B communicate with the internal space of the development housing 531.

The process cartridge 5 may include a shutter 302 and an engaging member 303.

Figure 20:
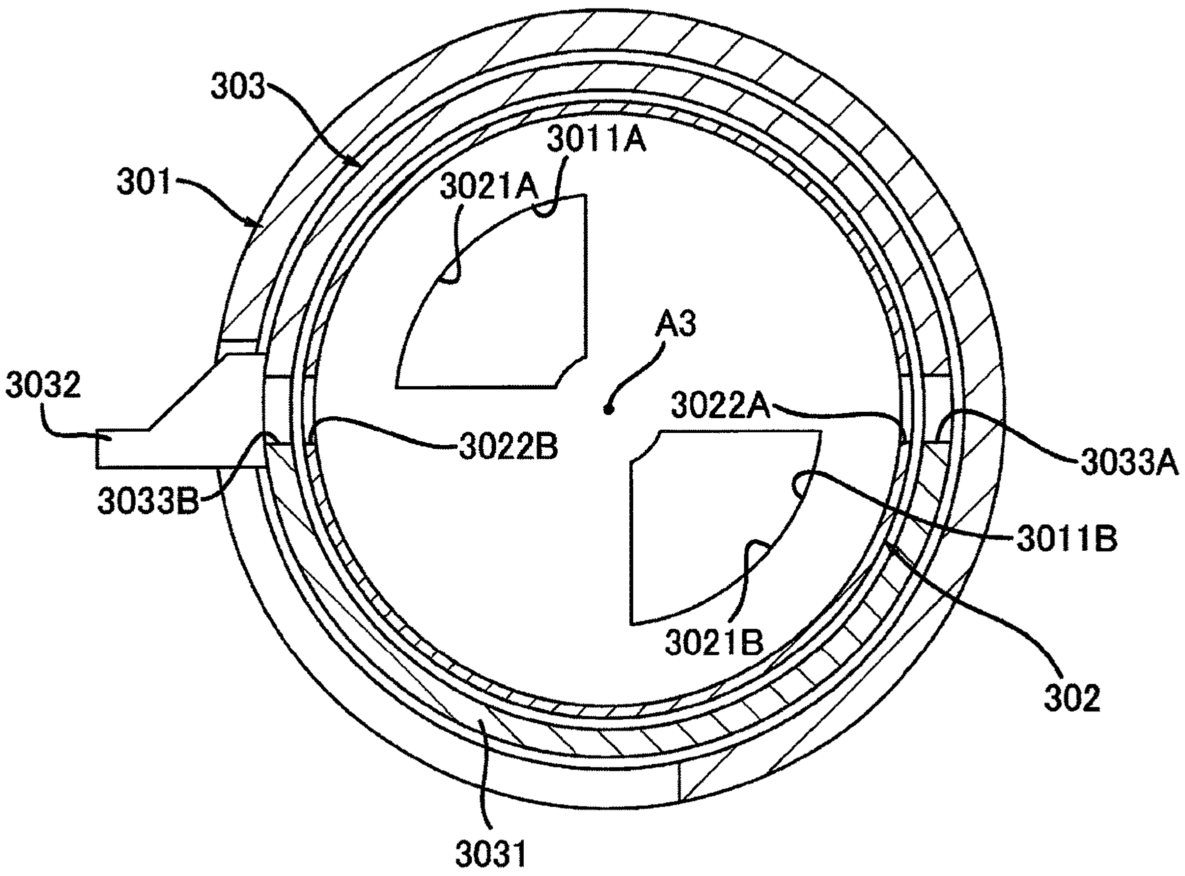
FIG. 20 shows a state where the shutter shown in FIG. 19 is located at a shutter open position.
Figure 21:
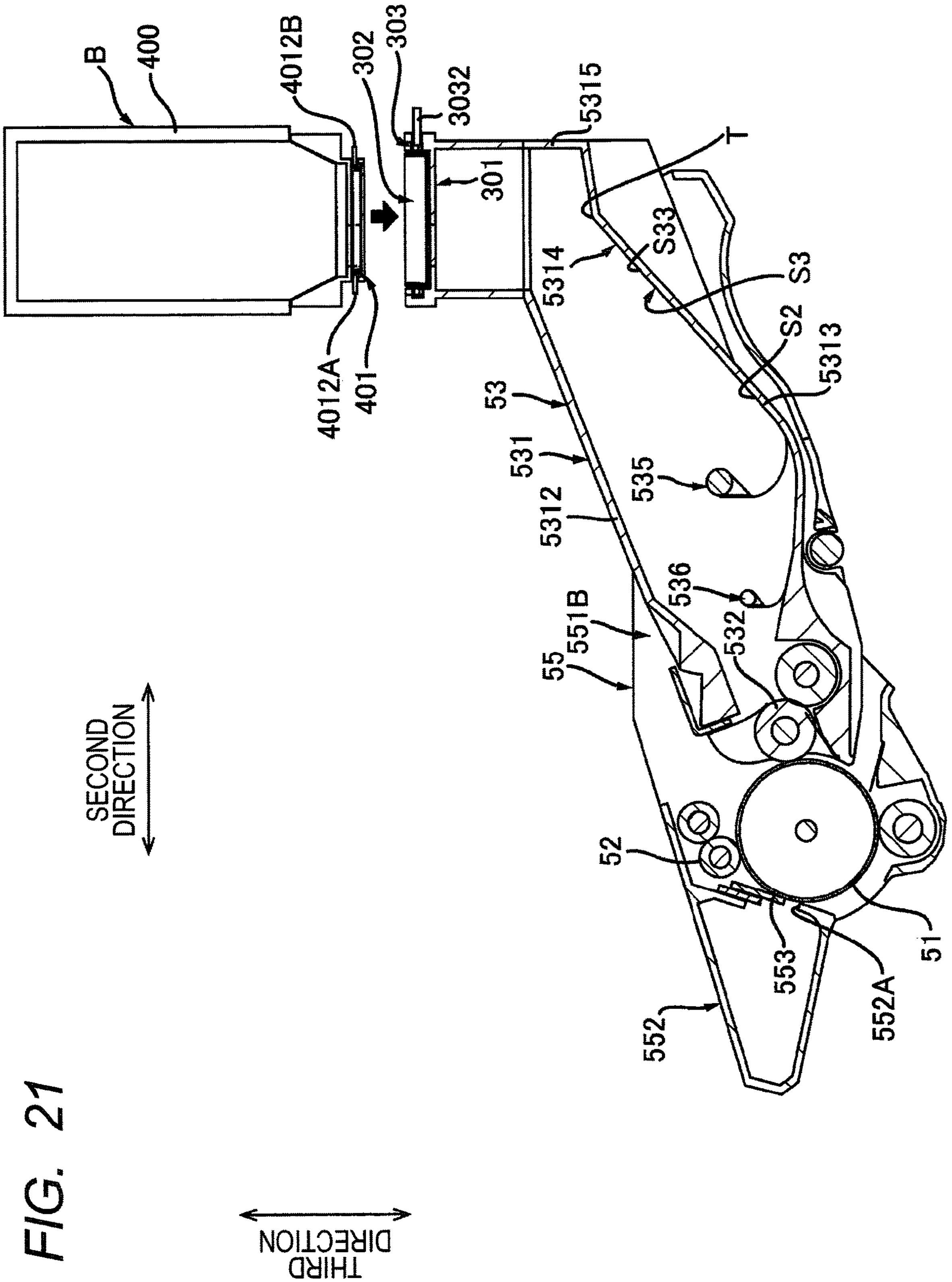
FIG. 21 is an explanatory view for explaining connection of a toner container to the process cartridge shown in FIG. 18.

The shutter 302 opens and closes the reception ports 3011A and 3011B. The shutter 302 is located within the reception portion 301. The shutter 302 has a cylindrical shape with a bottom wall. The shutter 302 extends in the third direction. As shown in FIGS. 19 and 20, the shutter 302 is movable between a shutter closed position (see FIG. 19) and a shutter open position (see FIG. 20). The shutter 302 is rotatable about an axis A3 extending in the third direction between the shutter closed position and the shutter open position. As shown in FIG. 19, in a state where the shutter 302 is located at the shutter closed position, the shutter 302 closes the reception ports 3011A and 3011B. As shown in FIG. 20, in a state where the shutter 302 is located at the shutter open position, the shutter 302 opens the reception ports 3011A and 3011B.

Specifically, as shown in FIG. 19, the shutter 302 has a plurality of shutter openings 3021A and 3021B and a plurality of grooves 3022A and 3022B.

The shutter openings 3021A and 3021B are located on the bottom wall of the shutter 302. As shown in FIG. 19, in a state where the shutter 302 is located at the shutter closed position, the shutter opening 3021A is separated from the reception port 3011A and the shutter opening 3021B is separated from the reception port 3011B. As shown in FIG. 20, in a state where the shutter 302 is located at the shutter open position, the shutter opening 3021A communicates with the reception port 3011A, and the shutter opening 3021B communicates with the reception port 3011B.

The grooves 3022A and 3022B are located on the circumferential wall of the shutter 302. The grooves 3022A and 3022B are arranged with an interval therebetween in the rotation direction of the shutter 302.

As shown in FIG. 19, the engaging member 303 has a main body 3031, a protrusion 3032, and grooves 3033A and 3033B.

The main body 3031 is located between the circumferential wall of the reception portion 301 and the circumferential wall of the shutter 302. The main body 3031 is located inside the circumferential wall of the reception portion 301 and outside the circumferential wall of the shutter 302 in the radial direction of the reception portion 301. The main body 3031 has a ring shape.

The protrusion 3032 is located outside the main body 3031 in the radial direction of the main body 3031. The protrusion 3032 extends in a radial direction of the main body 3031. The tip of the protrusion 3032 is located outside the circumferential wall of the reception portion 301. The protrusion 3032 is grasped by the user.

The grooves 3033A and 3033B are located in the main body 3031. The grooves 3033A and 3033B are arranged with an interval therebetween in the circumferential direction of the main body 3031. The groove 3033A faces the groove 3022A, and the groove 3033B faces the groove 3022B.

The toner container B may have a bottle main body 400 and a shutter 401.

Figure 22:
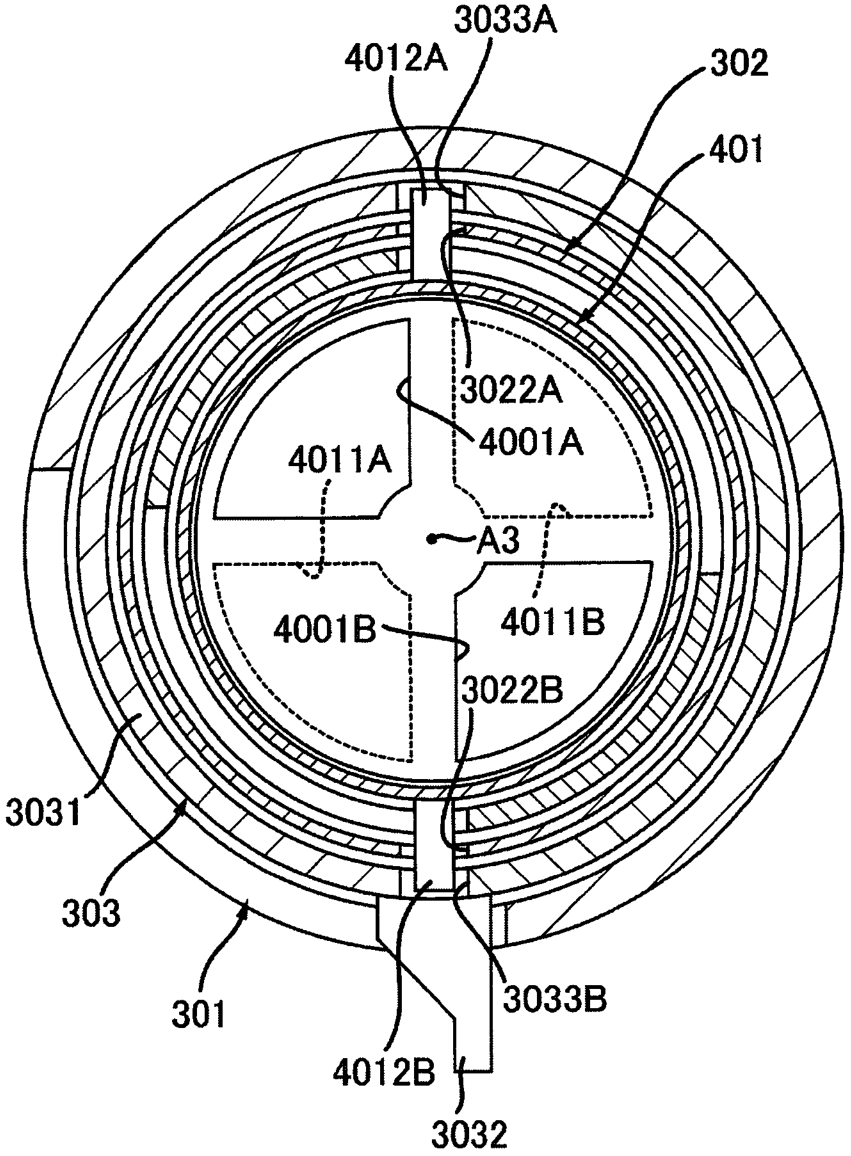
FIG. 22 is an explanatory view for explaining opening and closing of the shutter in a state where the toner container is connected to the process cartridge shown in FIG. 21, and shows a state where the shutter is located at the shutter closed position.

In a state where the toner container B is connected to the reception portion 301, the bottle main body 400 extends in the upper-lower direction. The bottle main body 400 contains toner. As shown in FIG. 22, the bottle main body 400 has a plurality of discharge ports 4001A and 4001B. In a state where the toner container B is connected to the reception portion 301, the discharge ports 4001A and 4001B are located at the lower end of the bottle main body 400. The discharge ports 4001A and 4001B discharge the toner inside the bottle main body 400.

Figure 23:
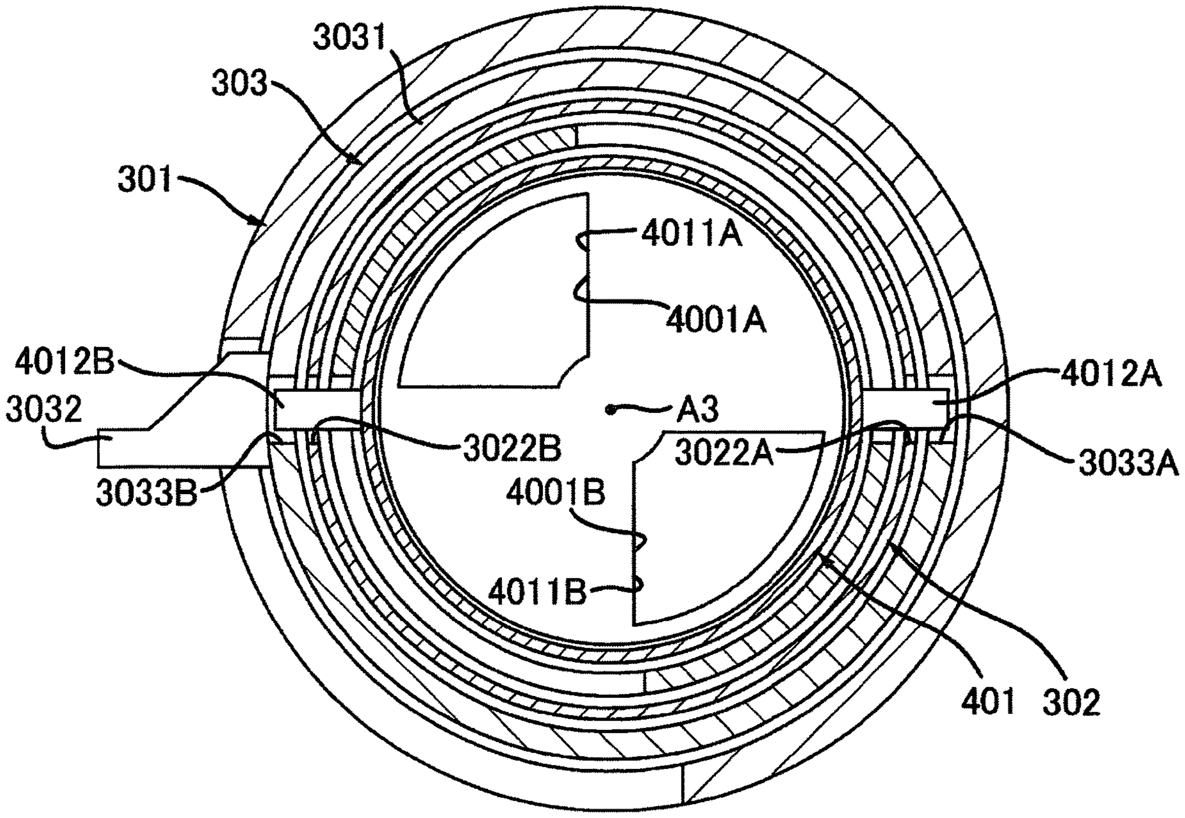
FIG. 23 shows a state where the shutter shown in FIG. 22 is located at the shutter open position.

The shutter 401 opens and closes the discharge ports 4001A and 4001B. The shutter 401 has a cylindrical shape with a bottom wall. As shown in FIGS. 22 and 23, the shutter 401 is movable between a shutter closed position (see FIG. 22) and a shutter open position (see FIG. 23). In a state where the toner container B is connected to the reception portion 301, the shutter 401 is rotatable about the axis A3 between the shutter closed position and the shutter open position. As shown in FIG. 22, in a state where the shutter 401 is located at the shutter closed position, the shutter 401 closes the discharge ports 4001A and 4001B. As shown in FIG. 23, in a state where the shutter 401 is located at the shutter open position, the shutter 401 opens the discharge ports 4001A and 4001B.

As shown in FIG. 22, the shutter 401 has a plurality of shutter openings 4011A and 4011B and a plurality of protrusions 4012A and 4012B.

The shutter openings 4011A and 4011B are located on the bottom wall of the shutter 401. As shown in FIG. 22, in a state where the shutter 401 is located at the shutter closed position, the shutter opening 4011A is separated from the discharge port 4001A, and the shutter opening 4011B is separated from the discharge port 4001B. As shown in FIG. 23, in a state where the shutter 401 is located at the shutter open position, the shutter opening 4011A communicates with the discharge port 4001A, and the shutter opening 4011B communicates with the discharge port 4001B.

The protrusions 4012A and 4012B are arranged with an interval therebetween in the rotation direction of the shutter 401. Each of the protrusions 4012A and 4012B is located on the outer surface of the shutter 401 in the radial direction of the shutter 401. Each of the protrusions 4012A and 4012B extends in the radial direction of the shutter 401. In a state where the toner container B is connected to the reception portion 301, the protrusion 4012A fits into the groove 3022A of the shutter 302 and the groove 3033A of the engaging member 303. In a state where the toner container B is connected to the reception portion 301, the protrusion 4012B fits into the groove 3022B of the shutter 302 and the groove 3033B of the engaging member 303. In a state where the protrusion 4012A fits into the grooves 3022A and 3033A and the protrusion 4012B fits into the grooves 3022B and 3033B, the shutters 401 and 302 are rotatable together with the engaging member 303. Thus, in a state where the toner container B is connected to the reception portion 301, the user grips the protrusion 3032 of the engaging member 303 and rotates the engaging member 303 about the axis A3 to open and close the shutters 401 and 302.

In this modification, too, effects similar to those of the above-described embodiment are obtained.

In this modification, the shutters 401 and 302 are configured to be opened and closed in a state where the toner container B is connected to the reception portion 301.

This suppresses spilling out of the toner in the toner container B when the toner container B is connected to the development housing 531.

(6) The development unit 53 may be a development cartridge that is attachable to and detachable from the process cartridge 5.

(7) The above-described embodiment and modifications (1) to (6) may be combined with each other.

What is claimed is:

1. An image forming apparatus comprising:
- a photosensitive drum rotatable about a drum axis extending in a first direction; and
- a development unit including:
  - a development housing configured to store toner, the development housing including two side walls, a first wall, and a second wall, the first wall connecting the two side walls, the second wall being located away from the first wall and connecting the two side walls; and
  - a development roller rotatable about a development axis extending in the first direction, the development roller being configured to supply the toner in the development housing to the photosensitive drum, the development housing including:

a reception port configured to receive toner from a toner container configured to store the toner to be supplied to the development housing, the reception port being located away from the development roller in a second direction crossing the first direction, the reception on being formed at the first wall; and a slope located below the reception port in the development housing, the slope including a first slope portion and a second slope portion, the first slope portion being inclined downward away from the reception port in the first direction, the second slope portion being inclined downward toward the development roller in the second direction, the slope being formed at the second wall.

2. The image forming apparatus according to claim 1, wherein a gradient of the first slope portion is greater than an angle of repose of the toner.

3. The image forming apparatus according to claim 1, wherein a gradient of the second slope portion is greater than an angle of repose of the toner.

4. The image forming apparatus according to claim 1, wherein the development housing includes a protruding wall located between the slope and the development roller in the second direction.

5. The image forming apparatus according to claim 1, further comprising:

an exposure device configured to expose the photosensitive drum;

a transfer device configured to transfer the toner on the photosensitive drum to a sheet; and a fuser configured to fix the toner transferred on the sheet to the sheet, wherein the reception port is located on an opposite side of the fuser with respect to the exposure device in the second direction.

6. The image forming apparatus according to claim 1, wherein the reception port is located at a center portion of the development housing in the first direction.

7. The image forming apparatus according to claim 1, wherein the reception port is located at an end portion of the development housing in the first direction.

8. The image forming apparatus according to claim 1, wherein the slope includes:

a first slope that is a flat surface serving as the first slope portion; and a second slope that is a flat surface serving as the second slope portion.

9. The image forming apparatus according to claim 1, wherein the slope is a curved surface including the first slope portion and the second slope portion.

10. The image forming apparatus according to claim 1, wherein the development housing includes:

the first wall having the reception port;

the second wall located below the first wall; and a protruding portion protruding from the second wall toward the first wall, the protruding portion having the slope at a side, wherein, when the protruding portion is viewed from above through the reception port, an apex of the protruding portion is located within the reception port.

11. A process cartridge comprising:

a photosensitive drum rotatable about a drum axis extending in a first direction; and a development unit including:

a development housing configured to store toner, the development housing including two side walls, a first wall, and a second wall, the first wall connecting the two side walls, the second wall being located away from first wall and connecting the two side walls; and a development roller rotatable about a development axis extending in the first direction, the development roller being configured to supply the toner in the development housing to the photosensitive drum, the development housing including:

a reception port configured to receive toner from a toner container configured to store the toner to be supplied to the development housing, the reception port being located away from the development roller in a second direction crossing the first direction, the reception port being formed at the first wall; and a slope located below the reception port in the development housing in a state where the reception port faces upward, the slope including a first slope portion and a second slope portion, the first slope portion being inclined downward away from the reception port in the first direction, the second slope portion being inclined downward toward the development roller in the second direction, the slope being formed at the second wall.

12. The process cartridge according to claim 11, wherein a gradient of the first slope portion is greater than an angle of repose of the toner.

13. The process cartridge according to claim 11, wherein a gradient of the second slope portion is greater than an angle of repose of the toner.

14. The process cartridge according to claim 11, wherein the development housing includes a protruding wall located between the slope and the development roller in the second direction.

15. The process cartridge according to claim 11, wherein the reception port is located at a center portion of the development housing in the first direction.

16. The process cartridge according to claim 11, wherein the reception port is located at an end portion of the development housing in the first direction.

17. The process cartridge according to claim 11, wherein the slope includes:

a first slope that is a flat surface serving as the first slope portion; and a second slope that is a flat surface serving as the second slope portion.

18. The process cartridge according to claim 11, wherein the development housing includes:

the first wall having the reception port;

the second wall located below the first wall; and a protruding portion protruding from the second wall toward the first wall, the protruding portion having the slope at a side, wherein, when the protruding portion is viewed from above through the reception port, an apex of the protruding portion is located within the reception port.

19. A process cartridge comprising:

a photosensitive drum rotatable about a drum axis extending in a first direction, and a development unit including:

a development housing configured to store toner, and a development roller rotatable about a development axis extending in the first direction, the development roller being configured to supply the toner in the development housing to the photosensitive drum, the development housing including:

a reception port configured to receive toner from a toner container configured to store the toner to be supplied to the development housing, the reception port being located away from the development roller in a second direction crossing the first direction, and a slope located below the reception port in the development housing in a state where the reception port faces upward, the slope including a first slope portion and a second slope portion, the first slope portion being inclined downward away from the reception port in the first direction, the second slope portion being inclined downward toward the development roller in the second direction, wherein the slope is a curved surface including the first slope portion and the second slope portion.

* * * * *